(12) United States Patent
 Norfolk

(10) Patent No.: US 12,098,703 B2
(45) Date of Patent: Sep. 24, 2024

(54) TRANSVERSE AXIS FLUID TURBINE FOR USE IN A WORKING FLUID FLOW

(71) Applicant: MAX NICHOLAS RENEWABLES LTD, Lowestoft (GB)

(72) Inventor: Robert Norfolk, Lowestoft (GB)

(73) Assignee: Max Nicholas Renewables Limited, Lowestoft (GB)

( * ) Notice: Subject to any disclaimer, the term of this patent is extended or adjusted under 35 U.S.C. 154(b) by 0 days.

(21) Appl. No.: 17/793,909

(22) PCT Filed: Jan. 22, 2021

(86) PCT No.: PCT/GB2021/050137
 § 371 (c)(1),
 (2) Date: Jul. 19, 2022

(87) PCT Pub. No.: WO2021/148796
 PCT Pub. Date: Jul. 29, 2021

(65) Prior Publication Data
 US 2022/0403818 A1  Dec. 22, 2022

(30) Foreign Application Priority Data
 Jan. 24, 2020  (GB) ..................... 2001035

(51) Int. Cl.
 *F03D 3/04* (2006.01)
 *F03D 3/06* (2006.01)
 *F03D 9/25* (2016.01)

(52) U.S. Cl.
 CPC .......... *F03D 3/0445* (2013.01); *F03D 3/061* (2013.01); *F03D 9/25* (2016.05)

(58) Field of Classification Search
 CPC ........ F03D 3/0445; F03D 3/061; F03D 3/062; F03D 3/0409; F03D 9/25; F05B 2230/60;
 (Continued)

(56) References Cited

U.S. PATENT DOCUMENTS 4,076,448 A * 2/1978 Sanders, Jr. .............. F03B 3/00
 417/334
4,452,046 A * 6/1984 Valentin .................... F03D 9/39
 60/641.11
(Continued)

FOREIGN PATENT DOCUMENTS

DE  19739921 A1 * 5/1999  ............. F03D 13/20
DE  19957141 A1   5/2001
(Continued)

OTHER PUBLICATIONS

Falkenstein WO2013041632—English Machine Translation-Espacenet (Year: 2013).*
(Continued)

*Primary Examiner* — Justin D Seabe
*Assistant Examiner* — Wayne A Lambert
(74) *Attorney, Agent, or Firm* — Kevin J Fournier Intellectual Property Legal Services Ltd.; Kevin J Fournier

(57) ABSTRACT

A rotor assembly comprises a rotor having a plurality of blades and an axis about which the rotor rotates, each blade being spaced from the axis of the rotor such that there is a gap between the axis and an inner edge of each blade through which fluid can flow, and inner and outer edges of each blade lying in and defining a blade plane and each blade being offset from the axis of the rotor such that the axis does not lie in the blade plane; a casing partially surrounding the rotor, the casing having a first opening to permit a fluid flow into or out of the casing in a direction generally perpendicular to the rotor axis; and a second opening at an axial end of the casing to permit a fluid flow into or out of the casing in a direction generally parallel to the rotor axis.

15 Claims, 9 Drawing Sheets

(58) Field of Classification Search
CPC ............ F05B 2240/93; F05B 2240/931; F05B 2240/244; F03B 13/264; F03B 17/062; Y02E 10/30; Y02E 10/74; Y02P 70/50
See application file for complete search history.

(56) References Cited

U.S. PATENT DOCUMENTS

| | | | | |
|---|---|---|---|---|
| 5,044,878 | A * | 9/1991 | Wilhelm | F03D 3/061 415/4.2 |
| 6,841,894 | B2 * | 1/2005 | Gomez Gomar | F03D 3/0409 290/55 |
| 6,870,280 | B2 * | 3/2005 | Pechler | F03D 3/0427 290/55 |
| 6,942,454 | B2 * | 9/2005 | Ohlmann | F03D 3/0445 290/55 |
| 7,056,082 | B1 * | 6/2006 | Taylor | F03D 3/049 415/13 |
| 7,521,816 | B2 * | 4/2009 | Helfrich | F03B 13/264 290/43 |
| 8,052,372 | B1 * | 11/2011 | Dvorak | F03D 3/0454 415/2.1 |
| 8,057,159 | B2 * | 11/2011 | Chong | F03D 9/25 416/88 |
| 8,063,502 | B1 * | 11/2011 | Voyles | F03D 15/20 290/55 |
| 8,469,665 | B2 * | 6/2013 | Bertony | F03D 3/0454 415/4.4 |
| 9,206,785 | B2 * | 12/2015 | Poole | F03D 3/02 |
| 9,371,818 | B1 | 6/2016 | Monto | |
| 10,495,063 | B2 * | 12/2019 | Baxter, Jr. | F03D 3/0418 |
| 10,697,428 | B1 * | 6/2020 | Einarsen | H02K 7/183 |
| 11,655,798 | B2 * | 5/2023 | Lerner | F03D 9/25 290/55 |
| 2002/0109358 | A1 * | 8/2002 | Roberts | F03D 3/0409 290/54 |
| 2008/0131273 | A1 * | 6/2008 | Fuller | F03D 3/062 415/203 |
| 2010/0213716 | A1 * | 8/2010 | Santoro | F03D 1/04 415/208.1 |
| 2011/0248498 | A1 * | 10/2011 | Tepic | F03D 9/007 290/7 |
| 2011/0250069 | A1 | 10/2011 | Quintal | |
| 2012/0119504 | A1 * | 5/2012 | Vigaev | F03D 3/0418 415/45 |
| 2013/0115069 | A1 | 5/2013 | Zha | |
| 2018/0180018 | A1 * | 6/2018 | Kurita | F03D 3/002 |

FOREIGN PATENT DOCUMENTS

| | | | |
|---|---|---|---|
| DE | 20115368 U1 | 12/2001 | |
| DE | 20207363 U1 | 9/2002 | |
| DE | 102009028820 A1 * | 2/2011 | ............ F03D 3/02 |
| DE | 202011104180 U1 | 11/2012 | |
| EP | 3786445 A1 * | 3/2021 | ............ F03D 3/002 |
| GB | 2269859 A | 2/1994 | |
| GB | 2475843 A * | 6/2011 | ............ F03D 3/002 |
| JP | H536075 U | 5/2013 | |
| KR | 100952684 B1 * | 4/2010 | |
| KR | 20110066002 A | 6/2011 | |
| KR | 20200006875 A * | 1/2020 | |
| WO | 03091569 A1 | 11/2003 | |
| WO | WO-2008062093 A1 * | 5/2008 | ............ F03D 3/0481 |
| WO | WO-2010148168 A1 * | 12/2010 | ............ F03D 3/02 |
| WO | WO-2013041632 A2 * | 3/2013 | ............ F03D 3/005 |
| WO | 2017027151 A1 | 2/2017 | |

OTHER PUBLICATIONS

International Search Report and Written Opinion of the International Searching Authority mailed in PCT Application No. PCT/GB2021/050137 on May 4, 2021, 11 pages.
International Preliminary Report on Patentability mailed in PCT Application No. PCT/GB2021/050137 on Jul. 7, 2022, 5 pages.
Examination Report under Section 18(3) issued in GB Patent Application No. GB2001035.1 issued on Aug. 8, 2022, 3 pages.
Examination Report issued in CA Patent Application No. CA3164532 on Nov. 8, 2022, 6 Pages.
Examination Report from New Zealand Intellectual Property Office, mailed on New Zealand patent application No. 790429 on Nov. 13.

* cited by examiner

TRANSVERSE AXIS FLUID TURBINE FOR USE IN A WORKING FLUID FLOW

FIELD OF THE INVENTION

This invention relates to rotor assemblies and in particular to rotor assemblies for use in transverse axis fluid turbines. The invention also relates to fluid turbine arrays and fluid turbine assemblies. The rotor assemblies of the present invention may also be adapted for use as a fluid pump or a propeller.

BACKGROUND

The best wind turbines used world-wide leave some 60 to 70% of the energy flowing through them as untapped. With global warming an ever-growing problem, improving this poor efficiency would provide a solution by more effectively offsetting electrical generation from fossil fuels.

These turbines are horizontal axis wind/water turbines (HAWT). They typically comprise a nacelle at the top of a mast or tower to which a rotor shaft is connected. The shaft has, most commonly, three blades attached. The HAWT will typically have a structure or mechanism that aligns the nacelle and rotor with the direction of wind.

These HAWT's are also known as lift type turbines because the rotor blades act like aircraft or hydrofoil wings that are lifted by fluid flow. The lift force acts generally perpendicular to the on-coming fluid and turns the rotor. The fluid loses kinetic energy by turning the rotor and gathers behind the rotor blades as 'dead-fluid' waiting for something else to move it away. It has to be moved otherwise it will block the flow stream (that is moving though the swept area of the blades). Like this, the turbine can only have a small number of blades because the gaps between the blades need to be large enough for the on-coming fluid to move the dead fluid away and keep the flow stream moving through the blade set. As a result, the efficiency is reduced because the kinetic energy in the fluid flowing between the blades is un-harvested by the turbine.

Over the years, efforts have been made to remove some of the dead-air behind wind turbines by the use of bulky structures erected around the circumference swept by the HAWT blades. Air passing around the additional structure is intended to draw dead-air out of the flow stream immediately downstream of the blades. This is known as a lensing effect. However, because of the additional bulk and the extra wind loading, a lot of additional material is needed to overcome the inherent structural problems. In theory, it should increase input power density (watts per square metre over the area swept by the blades) but in practice, any power gain is traded for blade length to reduce the size of the bulky lensing structure needed. This does little to improve efficiency because the same large gaps remain between the blades through which kinetic energy is still being lost, as described above.

The alternative to a HAWT is a vertical axis wind/water turbine (VAWT) also referred to as transverse axis turbines or cross-flow turbines. Broadly, there are two classes of VAWT—Darrieus and Savonius. The Darrieus class is based on a lift type turbine but is not as efficient as a HAWT. The Savonius class is based on a drag type turbine. This is because the blades present themselves as perpendicular, or flat-on, to the on-coming wind to generate maximum drag and turn the rotor without using lift force. However, this is even less efficient than the Darrieus class.

The poor efficiency of the drag type is due to each flat-on blade only presenting its full-face for a fleeting moment during each rotation of the rotor and that's only if the rotor has four or less blades. Any more and the full-face is never seen by the wind because it is always partially obscured by the trailing blade as the rotor turns. Additionally, the blades are slowed down by having to return into the fluid. Or, at best, having to push through still fluid if the rotor is sheltered from the on-coming fluid on the return side of the rotor. Folding the returning blades, to be sideways-on during the return half of the rotation, has been tried but requires too many moving parts to be structurally sound and commercially viable. The speed of rotation is also limited.

However, the drag type does have some advantages over the HAWT. Namely, for the same size of blade, lift force never quite matches drag force. This is because lift is an indirect force with inherent losses and drag is a direct force with no losses. Also, optimum efficiency from a HAWT lift type turbine requires a delicate balance of blade angle, blade profile, fluid speed and fluid turbulence. In terms of air, speed and turbulence are changeable so optimum (and published) efficiency is not continuously sustained. Conversely, optimum efficiency for a drag type turbine is readily achieved by simply placing a planar surface perpendicular to the fluid flow, regardless of its speed and turbulence. However, a perpendicular, full-face surface cannot be maintained (as described above) so it loses out to the HAWT.

All considered, the lift type HAWT is currently considered to be the best of the known fluid turbine designs in terms of efficiency. Additionally, even though drag force beats lift force, the HAWT lift type turbine does not have the disadvantage of one blade being partially obscured by another in the way that a drag type does. All the HAWT blades are continuously in drive. However, they need to be driven by air fluid is as non-turbulent (or laminar) as possible otherwise the lift force is lost. This greatly limits the places where the HAWT lift type can be deployed. In contrast, drag type turbines work in turbulent and non-turbulent air and can therefore be deployed in more places.

It is an aim of the present invention to provide an improved rotor assembly that may be used as a transverse axis fluid turbine that overcomes disadvantages of prior art designs, whether referred to herein or otherwise.

SUMMARY OF THE INVENTION

A first aspect of the present invention provides a rotor assembly comprising:

a rotor having a plurality of blades and an axis about which the rotor rotates, each blade being spaced from the axis of the rotor such that there is a gap between the axis and an inner edge of each blade through which fluid can flow, and inner and outer edges of each blade lying in and defining a blade plane and each blade being offset from the axis of the rotor such that the axis does not lie in the blade plane;

a casing partially surrounding the rotor, the casing having a first opening to permit a fluid flow into or out of the casing in a direction generally perpendicular to the rotor axis; and a second opening at an axial end of the casing to permit a fluid flow into or out of the casing in a direction generally parallel to the rotor axis wherein during a first mode of operation fluid flow through the rotor assembly is generally from the first opening to the second opening.

In some embodiments the rotor assembly preferably has a second mode of operation in which fluid flow through the rotor assembly is generally from the second opening to the first opening.

In preferred embodiments the rotor has between two and eight blades, more preferably three, four or five blades. The rotor may have two, three, four, five, six, seven or eight blades.

Angles between the blade planes of adjacent blades are preferably the same. Most preferably the rotor has four blades and the blade planes of adjacent blades are substantially perpendicular to each other.

In some embodiments the blades are flat, in other embodiments the blades may be curved. Preferably the rotor has four flat blades.

It may be desirable to configure the turbine and mount the blades such that, for each blade, an angle between the blade plane and a plane containing the turbine axis can be adjusted, with an angle between blade planes of adjacent blades remaining constant.

In preferred embodiments each blade is elongate in a direction parallel to the turbine axis and the casing is generally tubular.

In some preferred embodiments the first opening forms an inlet of the rotor assembly to permit a fluid flow to enter the casing to drive the rotor, and the second opening forms an outlet provided in an exhaust region at the axial end of the casing. In other embodiments the second opening forms an inlet of the rotor assembly, and the first opening forms an outlet of the rotor assembly.

A second aspect of the present invention provides a transverse axis fluid turbine for use in a working fluid flow comprising a rotor assembly according to the first aspect of the invention, the axis of the rotor defining an axis of the fluid turbine, an inlet section of the fluid turbine comprising at least a part of the casing and the inlet permitting a portion of the working fluid flow to enter the casing to drive the rotor, and wherein said fluid flow exits the casing through the exhaust region.

This aspect of the present invention therefore provides a new class of turbine that seeks to harvest a large portion of the untapped energy in current designs to provide high efficiency. The problems solved by this aspect of the invention are to maintain a full-face, perpendicular blade to the fluid stream at all times so as to make the best of the fact that drag force beats lift force; to maintain a degree of additional lift force on the blades; operate in fluid that is turbulent as well as laminar; to remove dead-fluid behind the blades without using energy in the flow stream; and, not only eliminate the resistance of a returning blade in the drag type, but also generate a suction that actually draws it back toward the fluid inlet. The last remaining problem that is solved by this invention is to do all this without the blades killing wildlife, generating low frequency noise, and causing light or shadow flicker when used in air, all of which HAWT's are prone to.

Finally, and very importantly, because the solution results in a new class of transverse axis wind turbine that uses more drag force than lift, this invention can be used in flowing fluids other than air, most particularly in water. HAWT perform badly under water because typically they have a tip speed ratio (TSR) greater than 1. This means the tips of the blades want to travel faster than the water flow. This causes drag and possible cavitation at the tips that reduces performance in liquids. The alternative is to shorten the blade length but that reduces the power harvested. This invention also solves that problem by having a TSR of less than 1 and no limit to blade length.

In preferred embodiments of the fluid turbine angles between the blades are such that part of the fluid flow within the inlet section may be deflected by a pressure surface of a first one of the blades through said gap between the axis and the blade inner edge and onto the pressure surface of a second one of the blades.

The fluid turbine may comprise a rotor cap disposed proximate an end of the blades. The rotor cap preferably has a radial dimension up to half the swept radius of the rotor. The rotor cap is arranged to at least partially restrict a flow of fluid from a region beyond the end of the blades into a central region of the rotor, including the gap between the turbine axis and the inner edge of each blade.

The turbine preferably comprises a drive shaft coaxial with the turbine axis.

The inlet section may comprise a guide panel extending outwardly from the casing at an edge of the inlet. The guide panel extends generally in a direction opposite the working fluid flow direction and the guide panel is arranged to guide a portion of the working fluid flow into the casing through the inlet.

The inlet section may comprise a return side guide panel extending outwardly from the casing proximate an edge of the inlet proximate a return side of the rotor. The return side guide panel is arranged to extend generally in a direction opposite the working fluid flow direction and is arranged to guide a portion of the working fluid flow into the casing through the inlet.

In preferred embodiments, during rotation of the rotor, each blade passes through a forward position at which the blade is proximate the inlet and the blade plane is parallel to but offset from a plane of the return side guide panel.

The inlet section may additionally or alternatively comprise a drive side guide panel extending outwardly from the casing proximate an edge of the inlet furthest from a return side of the rotor. The drive side guide panel is arranged to extend generally in a direction opposite the working fluid flow direction and is arranged to guide a portion of the working fluid flow into the casing through the inlet.

In embodiments including a return side guide panel and a drive side guide panel, the return side and drive side guide panels preferably diverge in a direction opposite the working fluid flow direction.

The inlet section preferably comprises an inlet baffle that partially blocks the inlet of the casing. The inlet baffle extends from a side of the inlet proximate a return side of the rotor and obscures a part of a drive side of the rotor. The inlet baffle is configured to obstruct a portion of the working fluid flow such that a region of reduced pressure is formed at the rear of the inlet baffle. Preferably the inlet baffle is moveable to alter the degree to which the inlet baffle obscures the drive side of the rotor. In preferred embodiments an edge of the inlet baffle can be set to lie substantially in the same plane as the blade in the forward position.

The fluid turbine may further comprise a funnel guide extending from a region proximate the inlet in a direction generally opposite to the working fluid flow direction. The funnel guide includes a flow surface disposed at an axial end of the casing inlet which is generally transverse to the turbine axis. The flow surface extends from the casing at an angle of at least 90° to the turbine axis so as to guide fluid flow into the inlet. The flow surface may include a proximal region adjacent the inlet configured to modify the working fluid flow through the inlet to be substantially perpendicular to the turbine axis. Preferably the proximal region of the flow surface is planar and an angle between the proximal region of the flow surface and the turbine axis is approximately 90°. The flow surface may include a distal region further from the inlet in which an angle between the flow surface and the turbine axis is greater than 90°.

In preferred embodiments the fluid turbine comprises two funnel guides, each disposed at a respective end of the inlet.

The fluid turbine preferably comprises an exhaust region at an axial end of the inlet section. In preferred embodiments the fluid turbine comprises two exhaust regions at opposite ends of the inlet section. The or each exhaust region preferably comprises an outlet and an exhaust baffle, the exhaust baffle being disposed upstream of the outlet relative to the working fluid flow to deflect a portion of the working fluid flow so as to create a region of reduced pressure at the outlet.

The fluid turbine may comprise an exhaust bypass surface extending from a region proximate the or each exhaust region in a direction generally opposite to the working fluid flow direction. The exhaust bypass surface is arranged to extend substantially parallel to the rotor axis and the exhaust bypass surface is preferably contoured so as to increase the velocity of the portion of the working fluid flow that strikes and is deflected by the exhaust baffle.

The fluid turbine may comprise an exhaust guide surface extending from a region proximate the or each exhaust region in a direction generally opposite to the working fluid flow direction. The exhaust guide surface is arranged to extend substantially transverse to the rotor axis and the exhaust guide surface is preferably contoured so as to increase the velocity of the portion of the working fluid flow that strikes and is deflected by the exhaust baffle.

Each blade of the rotor may extend into the exhaust region. In other embodiments each blade does not extend into the exhaust region.

In some embodiments fluid flow through the outlet is in a direction substantially parallel to the turbine axis. In other embodiments fluid flow through the outlet is in a direction substantially transverse to the turbine axis.

The exhaust region may comprise an end plate extending transverse to the turbine axis and spaced from an end of the inlet section. In some embodiments the end plate prevents fluid flow from the exhaust region in a direction parallel to the turbine axis and fluid flow from the exhaust region is only in a direction transverse to the turbine axis. In other embodiments the end plate includes at least one hole to allow a flow of exhaust fluid from the exhaust region in a direction substantially parallel to the turbine axis.

In preferred embodiments a part of the casing extends into the exhaust region and spans the distance between the inlet section and the end plate. The part of the casing in the exhaust region includes a gap that provides the outlet. The outlet preferably subtends an angle of approximately 270° from an upstream point of the casing in the direction of rotor rotation.

The exhaust baffle may extend in a direction parallel to the turbine axis to protrude beyond the end plate. A section of the exhaust baffle that protrudes beyond the end plate is preferably movable in a direction parallel to the working fluid flow direction so as to adjust the effect of the draw, generated by the baffle, on the exhaust outlet transverse to the turbine axis.

The fluid turbine may further comprise a tail panel disposed on the return side of the rotor and arranged to deflect working fluid flow around the side of the fluid turbine. The tail panel preferably extends in a plane parallel with the rotor axis and preferably spans at least the exhaust region of the turbine. The tail panel extends from the exhaust region in a direction generally the same as the working fluid flow direction. In some embodiments the tail panel may additionally span the inlet section of the turbine. The tail panel may extend in a direction generally opposite the working fluid flow direction such that a leading edge of the tail panel is upstream of the exhaust region. In embodiments including a return side guide panel, the leading edge of the tail panel is preferably in contact with the return side guide panel.

The fluid turbine preferably comprises means for attaching the fluid turbine to a structure. The fluid turbine may comprise means for rotatably attaching the fluid turbine to a post.

A third aspect of the invention provides a fluid turbine array comprising two fluid turbines, each fluid turbine being according to the second aspect of the invention, and the turbine axes of the fluid turbines being parallel to each other.

In embodiments in which each of the fluid turbines includes a drive side guide panel, the array may be configured such that the casings of the fluid turbines are adjacent each other, the drive side guide panels of the two fluid turbines extend in a direction substantially opposite to the working fluid flow direction, and the drive side guide panels of the two fluid turbines diverge in a direction opposite the working fluid flow direction.

In embodiments in which each of the fluid turbines includes a return side guide panel, the array may be configured such that leading edges of the return side guide panels furthest from the casings are joined such that working fluid flow between the return side guide panels is restricted.

The fluid turbines in the array may be arranged end to end such that the turbine axes of the fluid turbines are parallel and co-axial.

The fluid turbines in the array may be arranged such that the fluid turbines are offset from each other in a direction parallel to the turbine axes such that the inlet section of one of the turbines is disposed adjacent the exhaust region of the other one of the turbines.

A fourth aspect of the invention provides a fluid turbine assembly comprising a post and a fluid turbine according to the second aspect of the invention or a fluid turbine array according to the third aspect of the invention, the fluid turbine or the fluid turbine array being rotatably attached to the post.

The invention further provides a fluid turbine assembly comprising a post and a fluid turbine array according to the third aspect of the invention in which each of the fluid turbines comprises a return side guide panel and in which the post is disposed between the return side guide panels.

The invention further provides a fluid turbine assembly comprising a post and a fluid turbine array in which the axes of the fluid turbines are parallel to each other and in which the post is clamped between the two fluid turbines. In preferred embodiments of the fluid turbine assembly the turbine axis of the or each fluid turbine is parallel to an axis of the post.

A fifth aspect of the invention provides a method of generating electricity using a fluid turbine according to the second aspect of the invention, or a fluid turbine array according to the third aspect of the invention, or a fluid turbine assembly according to the fourth aspect of the invention, the method comprising connecting a drive shaft of the or each fluid turbine directly or indirectly to a generator.

A sixth aspect of the invention provides a pump comprising:
- a rotor assembly according to the first aspect of the invention;
- a drive shaft operably connected to the rotor assembly to rotate the blades about the axis of the rotor; and
- a motor connected to the drive shaft.

A seventh aspect of the invention provides a propeller comprising:
- a rotor assembly according to the first aspect of the invention and in which the second opening forms an inlet of the rotor assembly and the first opening forms an outlet of the rotor assembly;
- a drive shaft operably connected to the rotor assembly to rotate the blades about the axis of the rotor; and
- a motor connected to the drive shaft.

BRIEF DESCRIPTION OF THE DRAWINGS

The invention will now be further described by way of example only and with reference to the accompanying drawings, in which.

DETAILED DESCRIPTION

Figure 1:
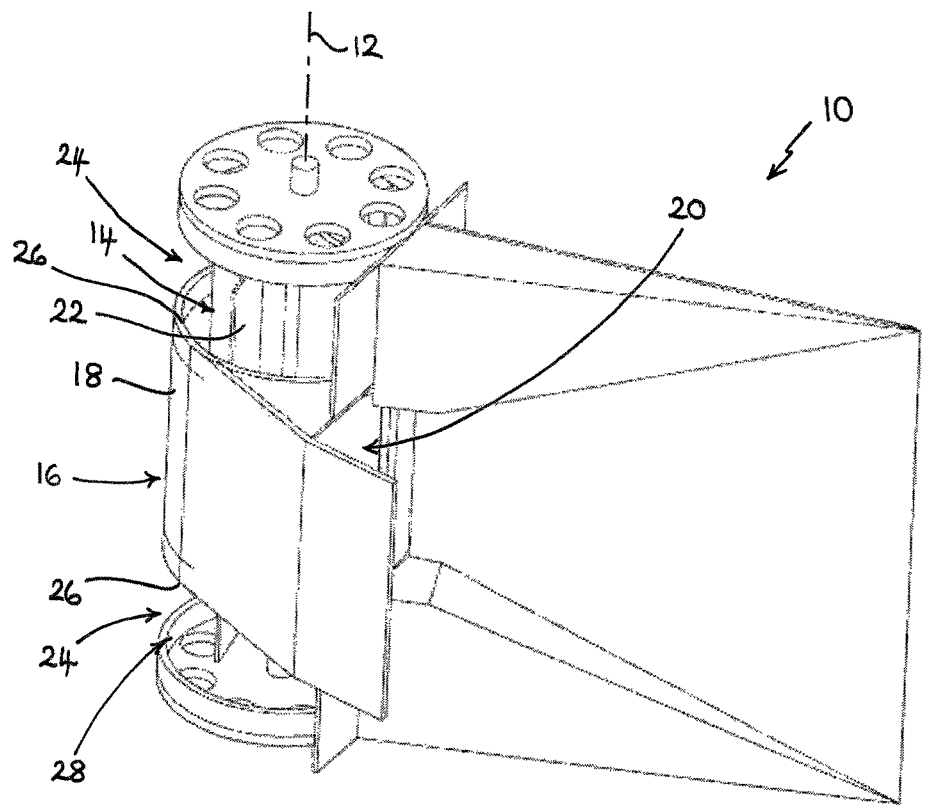
FIG. 1 is a perspective view of a fluid turbine according to a preferred embodiment of the present invention.

The present invention provides a rotor assembly that may form part of a fluid turbine, a fluid pump, a propeller, or other similar equipment and systems.

The rotor assembly comprises a rotor including a plurality of blades spaced and offset from a rotor axis, as described further below. A casing partially surrounds the rotor and includes a first opening that permits fluid flow into or from the rotor in a direction generally transverse to the rotor axis, and a second opening at an axial end of the casing that permits fluid flow into or from the rotor in a direction generally parallel to the rotor axis.

It is envisaged that the rotor assembly of the present invention will, in preferred embodiments, form part of a fluid turbine. In these embodiments the first opening of the casing provides an inlet of the fluid turbine, such that the fluid turbine is a transverse axis fluid turbine. The second opening of the casing provides an outlet of the rotor assembly. To generate electricity, the rotor is coupled to a drive shaft which is, in turn, preferably coupled to a generator.

In other embodiments the rotor assembly may form part of a fluid pump or a propeller. In these embodiments a drive shaft coupled to the rotor is driven by a motor. Rotation of the rotor by the motor creates or results in a fluid flow through the rotor assembly which may be used to pump fluid from one area to another if the rotor assembly is fixed to a static structure, or to create thrust if the rotor assembly is fixed to a floating or moveable structure. In some of these embodiments the rotor assembly may be driven to rotate in a first rotational direction. In other embodiments the rotor may be driven to rotate in a second and opposite rotational direction. Regardless of rotational direction, the second opening provides the inlet and the first opening provides the outlet.

The rotor assembly of the present invention will now be described further in relation to a particularly preferred embodiment of a fluid turbine. It will be appreciated, however, that aspects and features of the rotor assembly and fluid turbine described in this embodiment are also applicable to use of the rotor assembly as a fluid pump or propeller, as described further below.

A first preferred aspect of the present invention provides a fluid turbine having improved efficiency, compared to prior art designs, especially in turbulent fluid flow. The fluid turbine is a transverse axis fluid turbine or cross-flow fluid turbine, having its rotor axis transverse to the direction of the on-coming flow of the working fluid. The fluid turbine may be deployed in a liquid flow, such as water in a river or stream, or in a gas flow such as air. It is envisaged, in particular, that the fluid turbine may be mounted to a suitable structure to harness energy from the wind, or may be mounted to a floating structure to harness energy from a flow of water.

The fluid turbine is designed to orient itself into the direction of the working fluid flow. This fluid flow direction is hereinafter referred to as the working fluid flow direction, but may also be considered to be the surrounding fluid flow direction or the ambient fluid flow direction. Some embodiments of the fluid turbine may be fitted with a guide vane to assist and stabilise the ability to remain pointing upstream.

Figure 2:
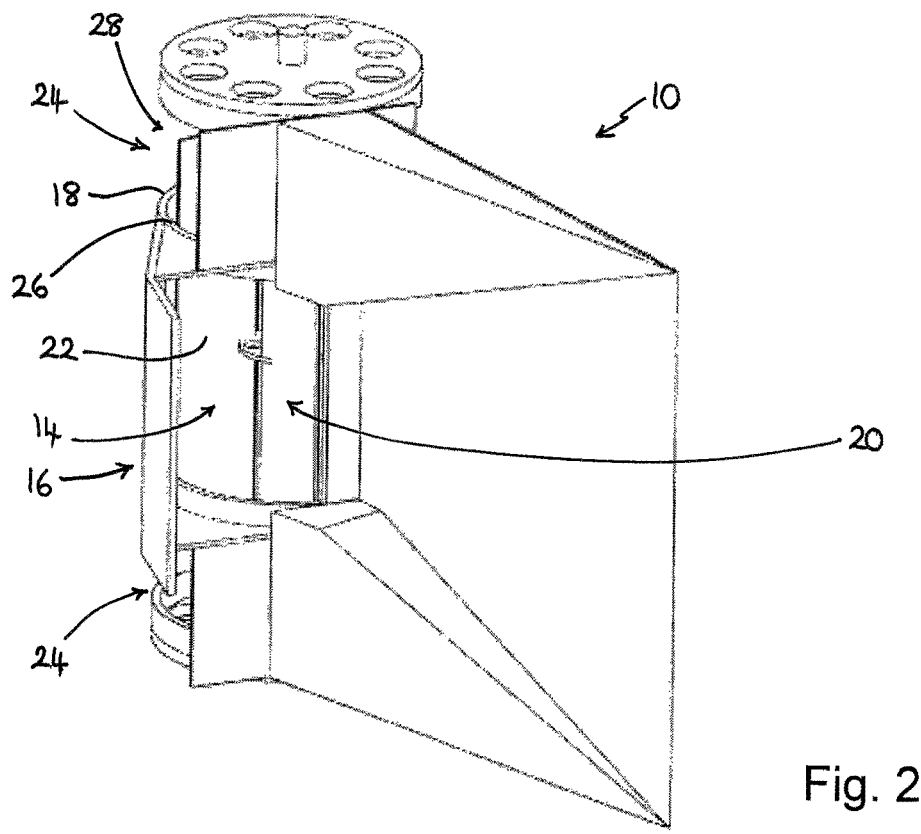
FIG. 2 is a further perspective view of the fluid turbine of FIG. 1.

FIGS. 1 and 2 illustrate a fluid turbine 10 according to an embodiment of the present invention. In some circumstances it may be beneficial or desirable to mount one or more of such fluid turbines 10 to a suitable post. It will be appreciated that this post may be at height to enable the fluid turbine 10 to harness energy from an air flow or may be underwater to enable the fluid turbine 10 to harness energy from a water flow. FIGS. 3 to 14 illustrate a pair of fluid turbines 10 mounted on a post. FIGS. 16 to 21 illustrate a further embodiment in which a fluid turbine 10 is mounted on a hull of a floating vessel or structure below the surface of the water. As will be appreciated, the fluid turbine 10 may be mounted such that an axis of the turbine 10 is vertical, horizontal or at any angle to the vertical or horizontal. The axis of the turbine 10 is, however, always oriented such that the axis is perpendicular to the predominant or prevailing working fluid flow direction.

The fluid turbine 10 comprises a rotor assembly including a rotor 14 partially surrounded at an inlet section 16 of the turbine 10 by a rotor housing or casing 18. A first opening or inlet 20 of the casing 18 permits a fluid flow into the casing 18 on a drive side of the rotor 14 to act on one or more blades 22 and rotate the rotor 14. It will be appreciated that the drive side of the rotor 14 is that in which a portion of the working fluid that enters the casing 18 acts directly on and applies a force to the blades 22 of the rotor 14. The return side of the rotor 14 is that in which the blades 22 are acted on indirectly by the working fluid flow and in which the blades 22 are moving back towards the inlet 20 of the casing 18.

Once the working fluid has imparted energy to the rotor 14 the fluid flows and/or billows in a direction substantially parallel to the axis 12 of the rotor 14 and into an exhaust region 24 of the turbine 10. The exhaust region 24 is, therefore, preferably disposed at an axial end 26 of the inlet section 16 (as shown most clearly in FIG. 6). The fluid that flows into the exhaust region 24 is defined as the exhaust fluid and the exhaust fluid exits the turbine 10 through a second opening or outlet 28 of the exhaust region 24. In this embodiment the exhaust fluid exits the turbine 10 through the outlet 28 in a direction substantially transverse to the turbine axis 12.

Referring now additionally to FIGS. 3 to 14, to increase the draw of exhaust fluid from the outlet 28, in preferred embodiments an exhaust baffle 86 is disposed upstream of the outlet 28 relative to the working fluid flow. The baffle 86 is arranged to deflect a portion of the working fluid flow so as to create a region of reduced pressure at the outlet 28 which causes exhaust fluid to be drawn from the exhaust region 24 of the turbine and out through the outlet 28.

In the illustrated preferred embodiment the inlet section 16 of the fluid turbine 10 comprises an inlet baffle 30. The inlet baffle 30 is arranged to restrict or limit fluid flow into the inlet 20 of the turbine 10. The inlet baffle 30 therefore acts as a choke. In particular, the inlet baffle 30 extends from a side 52 of the inlet 20 proximate the return side of the rotor 14 and obscures a part of the drive side of the rotor 14. A portion of the working fluid flowing though the inlet 20 flows over or past an edge 32 of the inlet baffle 30 such that an increase in velocity of the fluid creates a reduction in pressure as the flow pattern tends toward forming an eddy or vortex flow behind the inlet baffle 30 (relative to the working fluid flow direction) proximate the edge 32. This process of reducing pressure and the creation of an eddy creates a suction force on a returning blade 22 as the returning blade 22 passes or approaches the inlet baffle 30. This increases the rotational force acting on the blades 22 of the rotor 14.

Figures 15A, 15B:
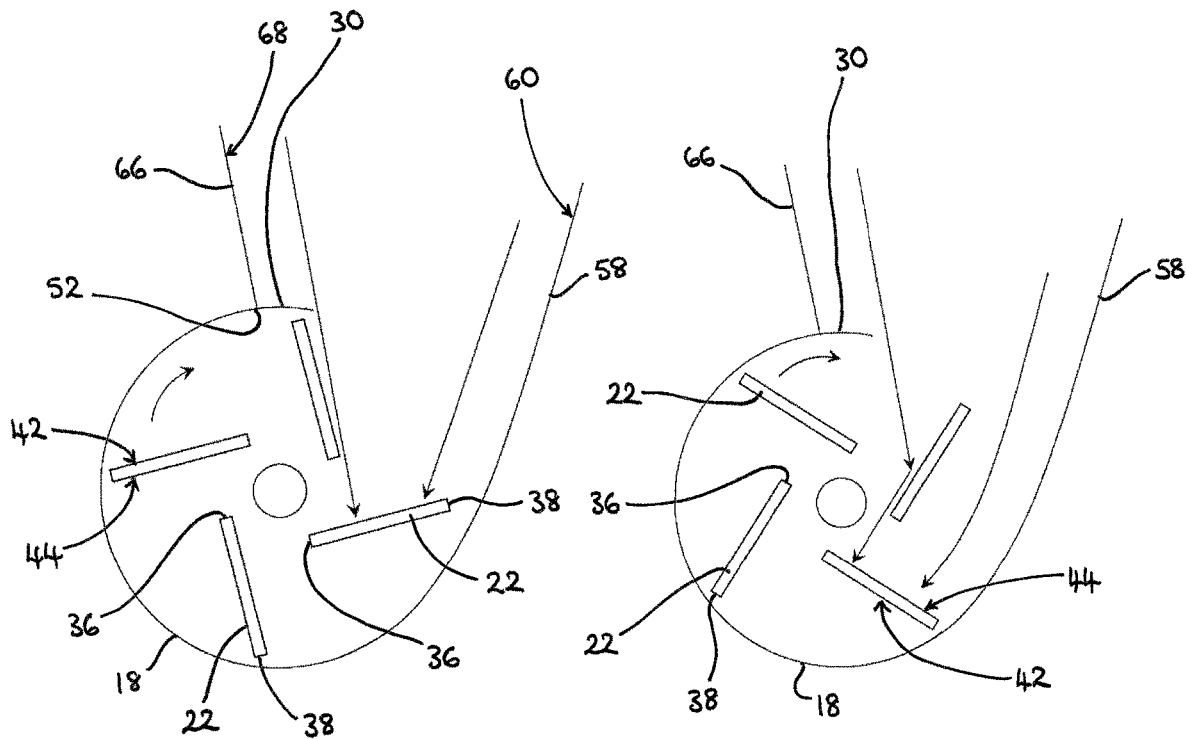
FIGS. 15a and 15b show rotor blades of the fluid turbine of FIG. 1 in two positions relative to an inlet of the fluid turbine.
Figure 16:
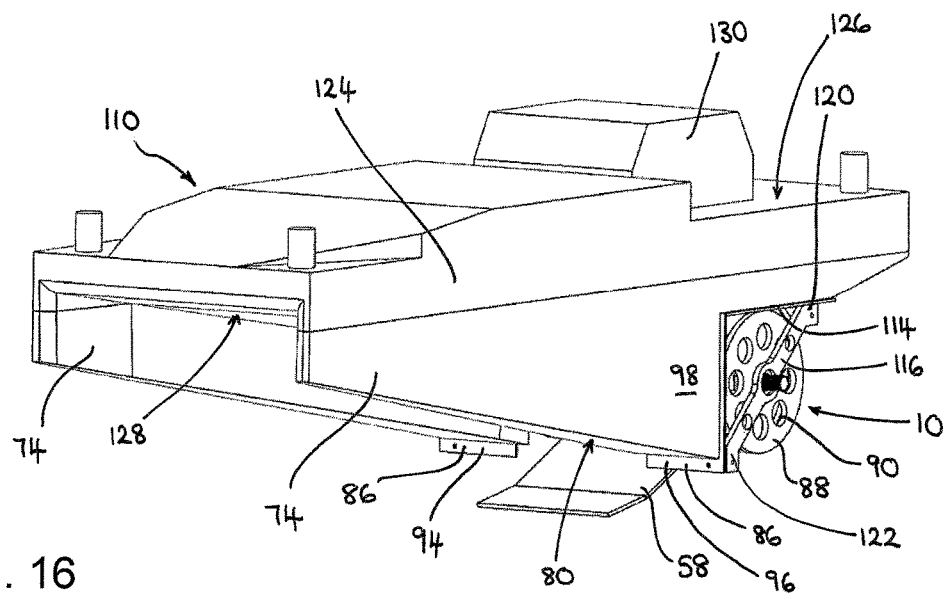
FIG. 16 is a perspective view of a floating turbine assembly according to a further embodiment of the present invention.
Figure 17:
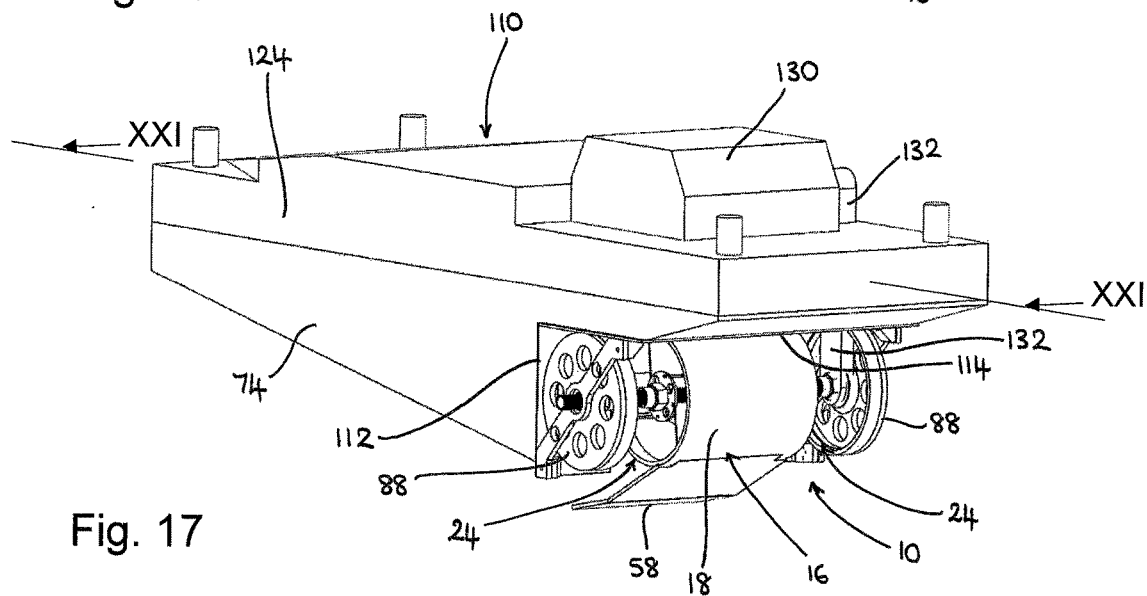
FIG. 17 is a further perspective view of the floating turbine assembly of FIG. 16.
Figure 18:
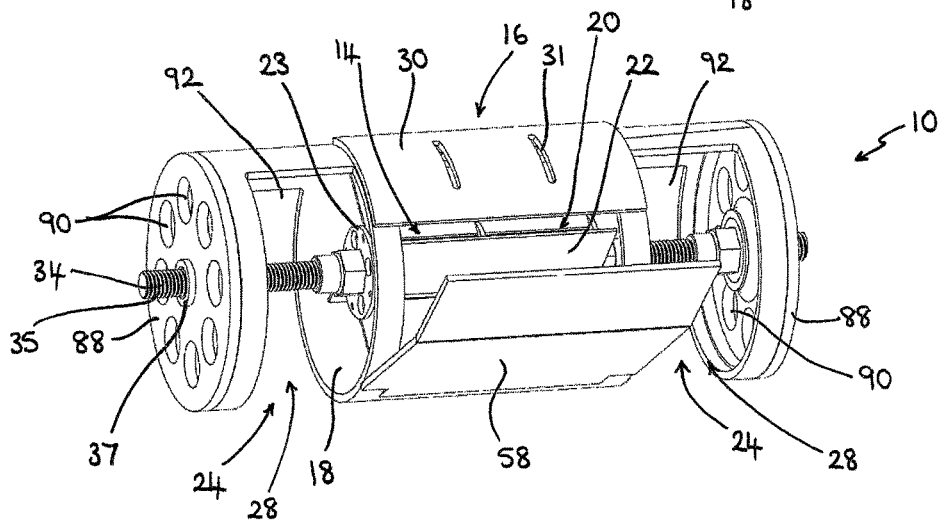
FIG. 18 is a perspective view of the turbine of the floating turbine assembly of FIG. 16.
Figure 19:
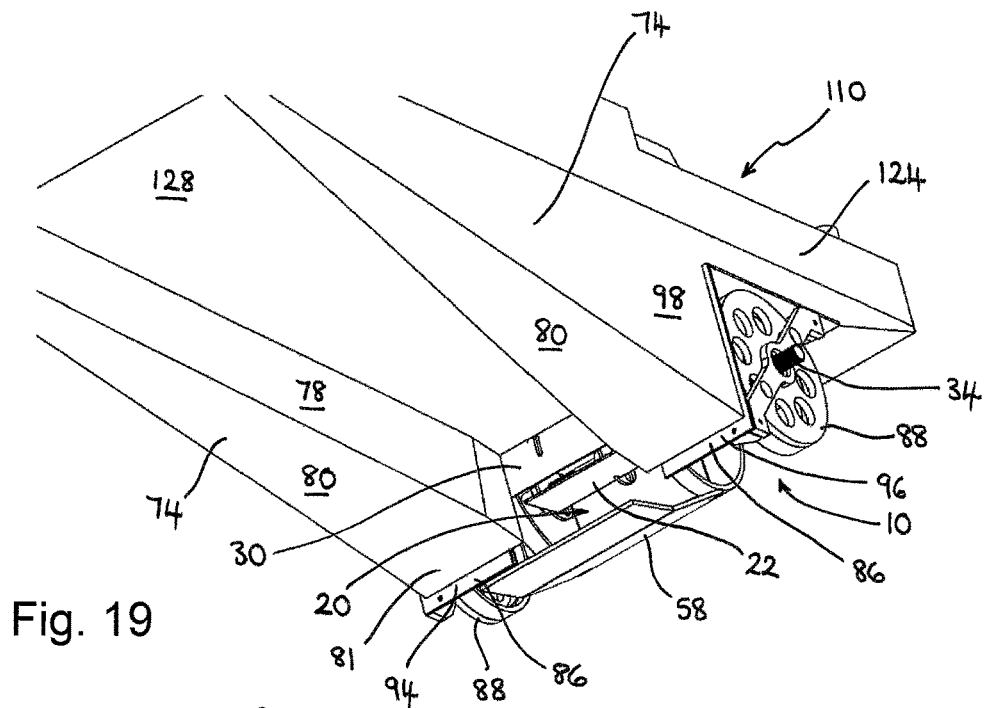
FIG. 19 is a view from below of a part of the floating turbine assembly of FIG. 16.
Figure 20:
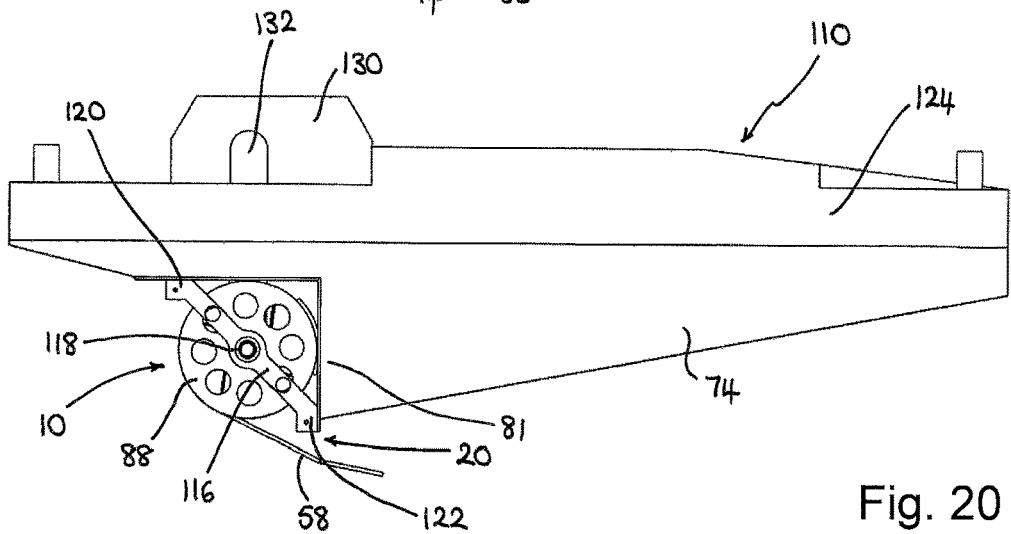
FIG. 20 is a plan view from the side of the floating turbine assembly of FIG. 16.
Figure 21:
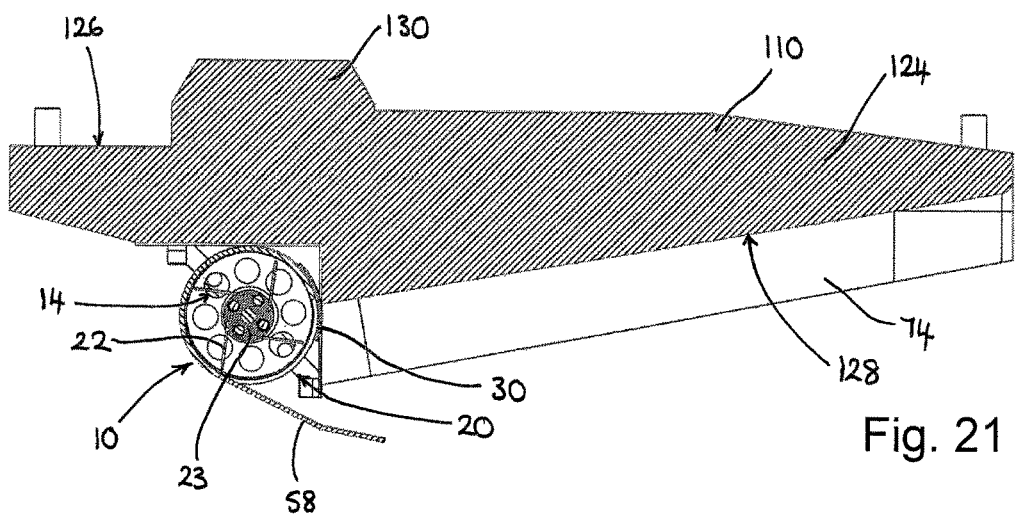
FIG. 21 is a cross-sectional view of the floating turbine assembly along the line XXI-XXI of FIG. 17.

As most clearly shown in FIG. 15a, in this embodiment the inlet baffle 30 is integral with casing 18 where casing 18 forms an edge 52 to inlet 20. In another embodiment inlet baffle 30 may be separate from and attached to the casing 18 proximate the return side of the rotor 14 such that it may be moveable. The extent to which the inlet baffle 30 obscures the inlet 20 is therefore adjustable. This can permit fine tuning of the performance of the fluid turbine 10, to increase efficiency as the fluid flow changes for example. This also allows the inlet baffle 30 to be used to provide turndown (or rangeability) of the fluid turbine 10 if or when the speed of the working fluid flow drops. In particular, the inlet baffle 30 may be movable to obscure more of the inlet 20, thereby reducing the area of the inlet 20 and increasing the velocity of the fluid flow through the inlet 20 (for the same flow volume). In conditions in which the fluid flow is too fast for the fluid turbine 10 to operate the inlet baffle 30 may be moved so as to completely block or cover the inlet 20.

The fluid turbine 10 preferably includes a generator for converting the power produced by the rotor 14 into electricity. A drive shaft 34 of the rotor 14 may be connected to a generator by a suitable gear box. In other embodiments the drive shaft 34 of the rotor 14 may be connected directly to a generator or alternator. In the following description in relation to the embodiment shown in FIGS. 3 to 14, the connection of the rotor 14 to a generator is not described in detail, and any suitable arrangement known in the art may be used to provide this connection.

Figure 3:
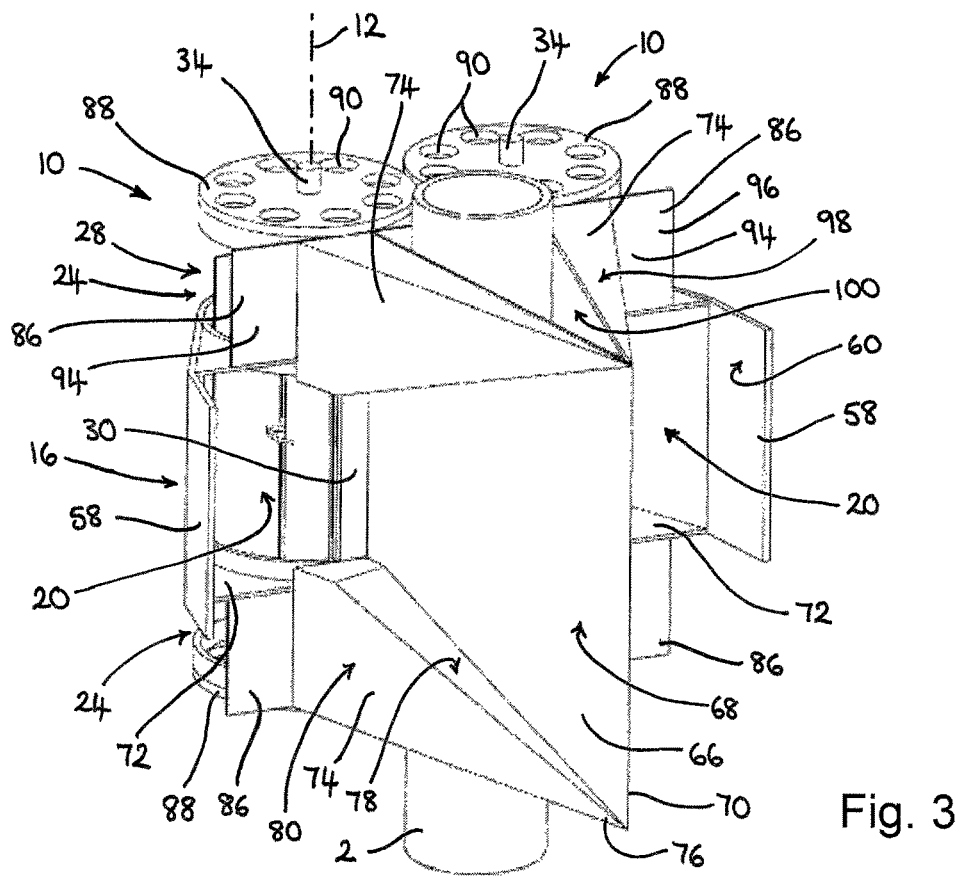
FIG. 3 is a perspective view of a fluid turbine array according to a preferred embodiment of the present invention including a pair of fluid turbines.
Figure 4:
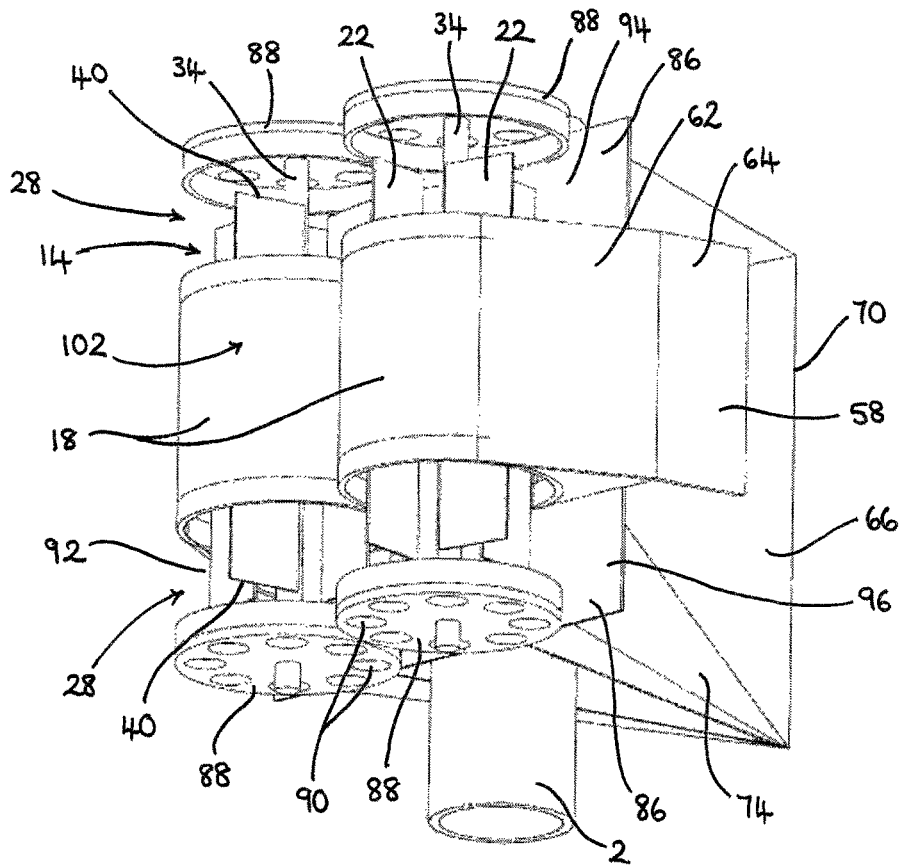
FIG. 4 is a further perspective view of the fluid turbine array of FIG. 3.
Figure 5:
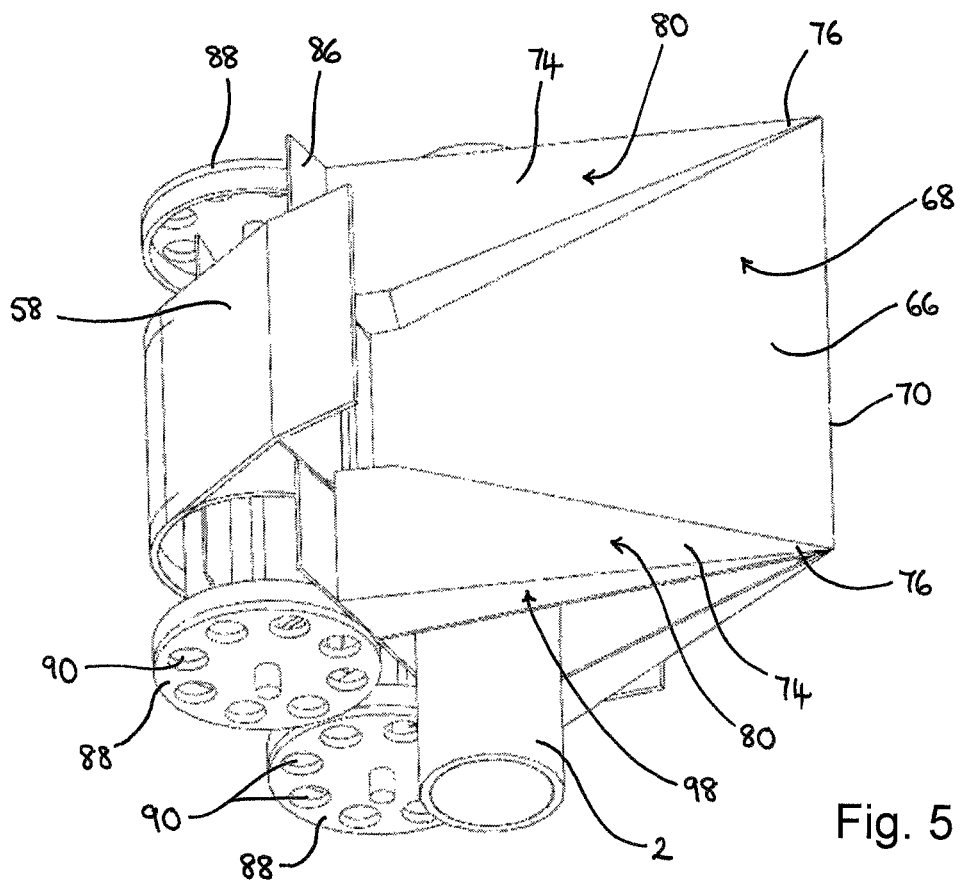
FIG. 5 is a further perspective view of the fluid turbine array of FIG. 3.

As shown in FIGS. 3 to 5, the fluid turbine 10 may be mounted to a post or mast 2. It may be desirable to mount a pair of fluid turbines 10 to the post 2 to form a fluid turbine array. Preferably the fluid turbine 10 or each fluid turbine 10 is mounted to the post 2 such that an axis of the turbine 10, and therefore a rotational axis 12 of the rotor 14, is substantially parallel to an axis of the post 2. In some situations however, the fluid turbine 10 may be mounted to the post 2 such that the axis of the turbine 10 is transverse to the axis of the post 2.

To allow the fluid turbine 10 to orient into the working fluid flow direction, the fluid turbine 10 is preferably attached to the post 2 such that the fluid turbine 10 can rotate about the post 2. Alternatively, the fluid turbine 10 may be attached in a fixed position to a part of the post 2 and at least that part of the post 2 may be rotatable.

It will be appreciated that while the accompanying FIGS. 3 to 14 illustrate a fluid turbine array comprising two fluid turbines 10, the following description initially describes the features of a single fluid turbine and then describes possible arrangements of fluid turbines in an array or assembly.

The Rotor

In the illustrated embodiment the rotor 14 comprises a central drive shaft 34 and four rotor blades 22. Each blade 22 comprises an inner edge 36, an outer edge 38, and two end edges 40. The inner edge 36 of each blade 22 is closer to the drive shaft 34 or rotational axis 12 of the rotor 14 than the outer edge 38. Each of the inner and outer edges 36, 38 extend substantially parallel to the rotational axis 12. Each blade 22 also comprises a leading or suction surface 42 and a trailing or pressure surface 44. Each blade 22 may be planar, as shown, curved, or any other suitable shape. In other embodiments the rotor 14 may comprise fewer than or more than four blades 22. The rotor 14 preferably comprises multiple blades 22, and more preferably comprises between two and eight blades 22. The rotor 14 may include two, three, four, five, six, seven or eight blades 22.

The inner and outer edges 36, 38 of each blade 22 lie in and define a plane of that blade 22 (a blade plane). The blades 22 are spaced equidistantly around the drive shaft 34. Additionally, angles between adjacent blades or adjacent blade planes are equal. The blades are preferably equiangular to each other. In this embodiment of four blades there is an angle of 90° between the blade planes of adjacent blades 22, i.e. the blade planes of adjacent blades 22 are substantially perpendicular to each other. Each of the blades 22 is spaced from the drive shaft 34 thereby defining an annular gap 46 between the drive shaft 34 and the inner edges 36 of the blades 22 (as shown most clearly in FIG. 11). Each blade 22 has a blade plane that is radially offset from the axis 12 of the rotor 14 such that the rotor axis 12 does not lie in the blade plane of any of the multiple blades 22. In other embodiments the blades 22 may be attached to and extend from the drive shaft 34.

The blades 22 are arranged such that the inner edge 36 is a leading edge and the outer edge 38 is a trailing edge of the blade 22 relative to the direction of rotation of the rotor 14.

Preferably, the blades 22 are elongate in a direction parallel to the turbine axis 12. Alternatively, the blades may be square or elongate in a direction transverse to the axis 12.

Particularly, but not exclusively, in embodiments in which the blades 22 are not attached to the drive shaft 34, each of the blades 22 may be attached to and supported by at least one blade shaft (not shown). Each blade shaft preferably extends substantially parallel to the rotor axis 12. The blade shafts may be configured such that the blades 22 can be rotated about the blade shaft(s) to change an angle between the leading surface 42 of the blade 22 and a plane containing the inner edge 36 of the blade 22 and the rotor axis 12. This allows the pitch of the blades 22 to be altered. It will be appreciated that the pitch of each of the blades 22 will be altered to the same degree such that an angle between adjacent blades 22 remains constant. For example, in embodiments in which the rotor 14 comprises four blades 22, the pitches of the blades 22 may be altered so that there is still an angle of about 90° between the blade planes of adjacent blades.

A rotor cap is preferably disposed proximate an end of the blades 22. The rotor cap may comprise a plate or disc member that extends from the rotor axis 12 and has a radial dimension substantially the same as a distance between the rotor axis 12 and the inner edge of each blade. The rotor cap is therefore arranged to at least partially restrict a reverse flow of fluid from a region beyond the end of the blades 22 into a central region of the rotor 14 including the gap 46 between the rotor axis 12 and the inner edge of each blade 22. During rotation of the rotor 14, a region of reduced pressure is created in the central region of the rotor 14. This region of reduced pressure can cause exhaust fluid that has exited the inlet section 16 to flow back towards the central region of the rotor 14. This reduces the efficiency of the turbine 10. The rotor cap is arranged to restrict or prevent this return flow of exhaust fluid. In some embodiments the rotor cap may include one or more holes to obtain the desired or correct level of restriction of fluid flow.

While the radius of the rotor cap will generally be substantially the same as the distance between the rotor axis 12 and the inner edge of the blade(s) 36, in some embodiments the radius of the rotor cap may be larger than this such that the rotor cap spans an area up to half the swept radius of the rotor 14. In other embodiments the rotor cap radius may be smaller than the distance between the rotor axis 12 and the inner edge 36 of the or each blade 22.

In embodiments including a drive shaft 34 extending between the blades 22 the rotor cap may not be necessary as the presence of the drive shaft 34 may be sufficient to disrupt or restrict the return exhaust fluid flow.

The Inlet Section

The rotor 14 is partially surrounded by a shroud or casing 18 that forms a housing of the inlet section 16 of the fluid turbine 10. In the preferred embodiment, the casing 18 is generally cylindrical. In other embodiments, the casing may be generally tubular with any suitable cross-sectional shape that promotes a circulation of fluid around the axis 12. An axis of the casing 18 is co-axial with the rotor axis 12. The smallest internal diameter of the casing 18 is only slightly larger than the diameter of the circle swept by the outer edges 38 of the blades 22 during rotation of the rotor 14. Accordingly, the outer edges 38 of the blades 22 are disposed close to an inner surface 48 of the casing 18, and a gap between the outer edge 38 of each blade 22 and the inner surface 48 of the casing 18 is as small as possible.

The casing 18 includes the inlet 20 which permits a flow of fluid into the casing 18. In particular, in use, a portion of the working fluid flow will enter the casing 18 through the inlet 20 to drive rotation of the rotor 14. This portion of the working fluid entering the casing 18 through the inlet 20 may be considered to be an inlet fluid flow. The inlet fluid flow strikes or impinges on the trailing surface or pressure surface 44 of each blade 22 on the drive side of the rotor 14. The inlet fluid flow therefore applies a force to the blades 22 on the drive side of the rotor 14 to drive rotation of the rotor 14.

The inlet 20 is preferably in the form of an opening or slot 50 in the casing 18. The slot 50 is elongate in a direction parallel to the rotor axis 12. The slot 50 has opposite first and second side edges 52, 54 that extend in a direction substantially parallel to the rotor axis 12 and opposite end edges 56 that extend transverse to the rotor axis 12. The first side edge 52 is disposed upstream of the rotor 14 relative to the working fluid flow direction and lies in or near a plane defined by the rotor axis 12 and the working fluid flow direction.

An outer guide panel or drive side guide panel 58 extends from the casing 18 at the second side edge 54 of the inlet 20. The drive side guide panel 58 includes an outboard guide surface 60. In this embodiment the drive side guide panel 58 is integral with the casing 18. In other embodiments the drive side guide panel 58 may be separate from and attached to the casing 18 such that its position on the casing can be altered on a plane transverse to the axis 12 so as to indirectly alter the angle of the drive side guide panel 58 with respect to the working fluid flow. The drive side guide panel 58 extends generally outwardly from the casing 18 and generally in a direction opposite to the working fluid flow direction. In this way the drive side guide panel 58 captures a portion of the working fluid flow upstream of the inlet section 16 of the fluid turbine 10 and the outboard guide surface 60 guides or funnels the flow towards and through the inlet 20.

In this embodiment the drive side guide panel 58 comprises at least two segments: a proximal segment 62 adjacent the casing 18 and a distal segment 64 furthest from the casing 18. The two segments 62, 64 are connected by a hinge such that an angle between the two segments 62, 64 can be altered. The drive side guide panel 58 is also attached to the casing 18 by a hinge such that an angle between the casing 18 and the drive side guide panel 58, and in particular the proximal segment 62, can be adjusted. This allows the shape or contour of the drive side guide panel 58 to be altered to capture a greater or lesser volume of the working fluid flow.

The segments 62, 64 of the drive side guide panel 58 may be connected to each other and to the casing 18 by any suitable connectors that allow an angle between the segments 62, 64 to be adjusted. In other embodiments the drive side guide panel 58 may have a fixed shape. The drive side guide panel 58 may extend from the casing 18 at a fixed angle.

Figure 6:
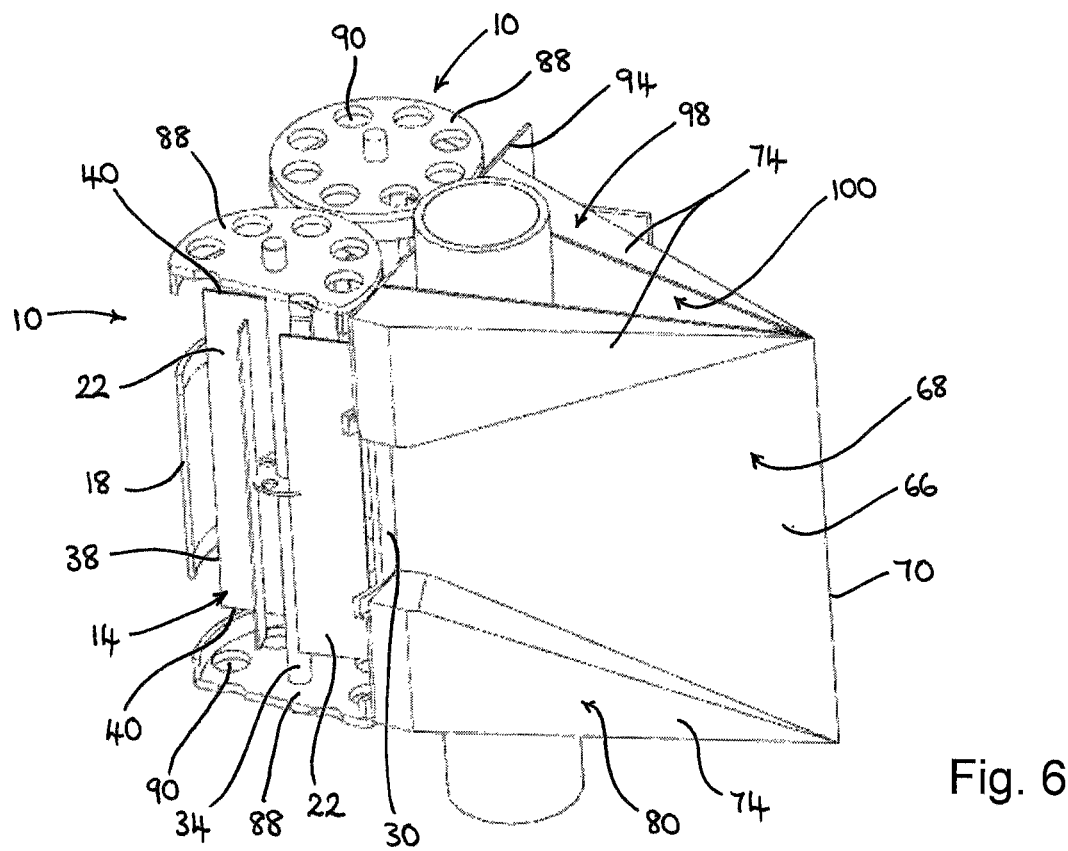
FIG. 6 is a perspective sectional view of the fluid turbine array of FIG. 3 along the line VI-VI of FIG. 9.
Figure 7:
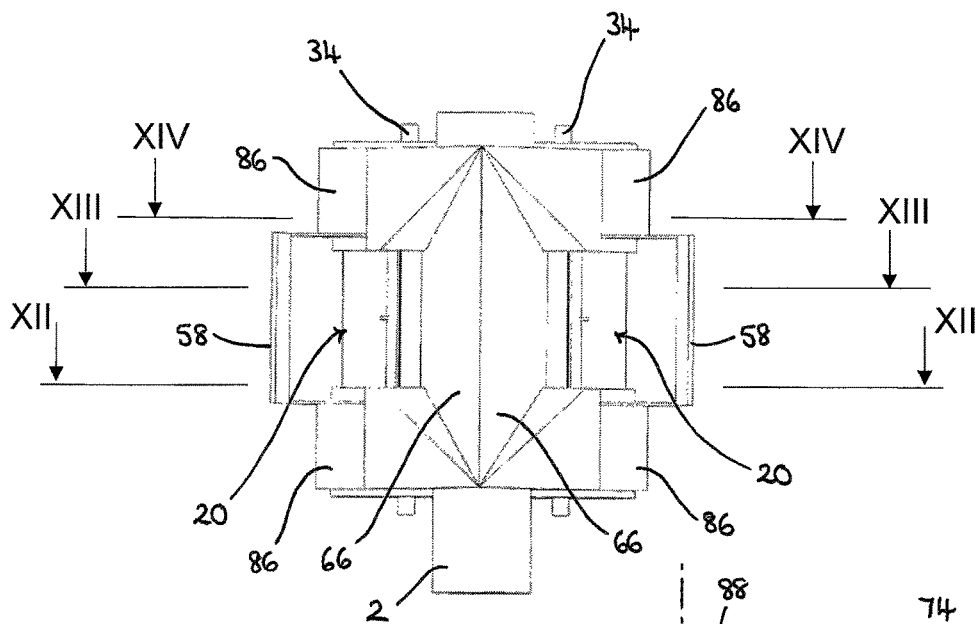
FIG. 7 is a front elevation of the fluid turbine array of FIG. 3.
Figure 8:
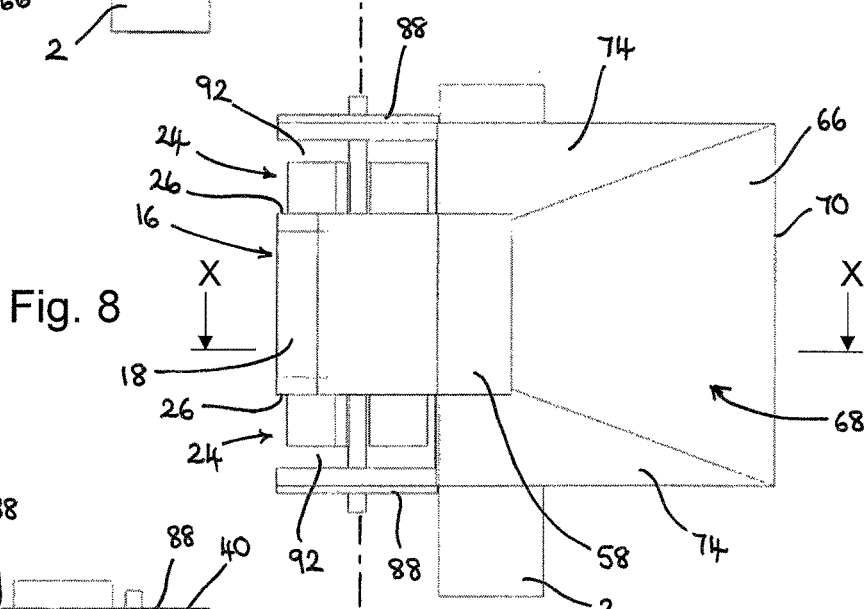
FIG. 8 is a side elevation of the fluid turbine array of FIG. 3.
Figure 9:
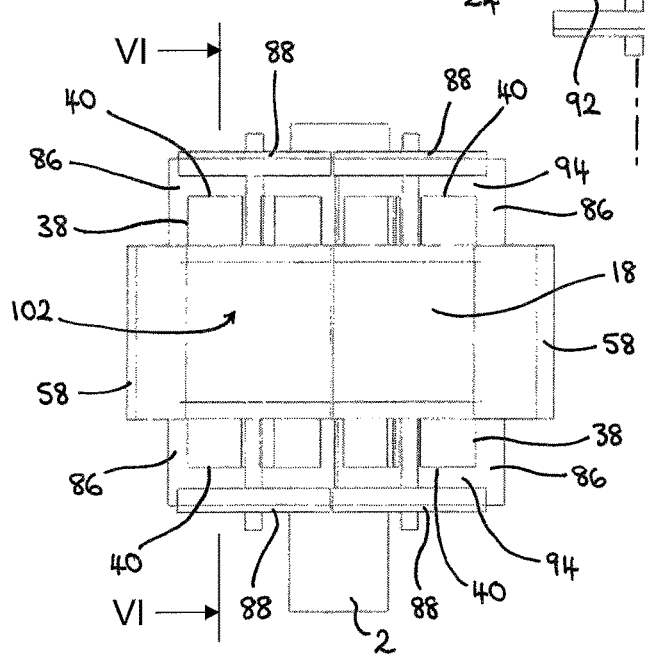
FIG. 9 is a rear elevation of the fluid turbine array of FIG. 3.
Figure 10:
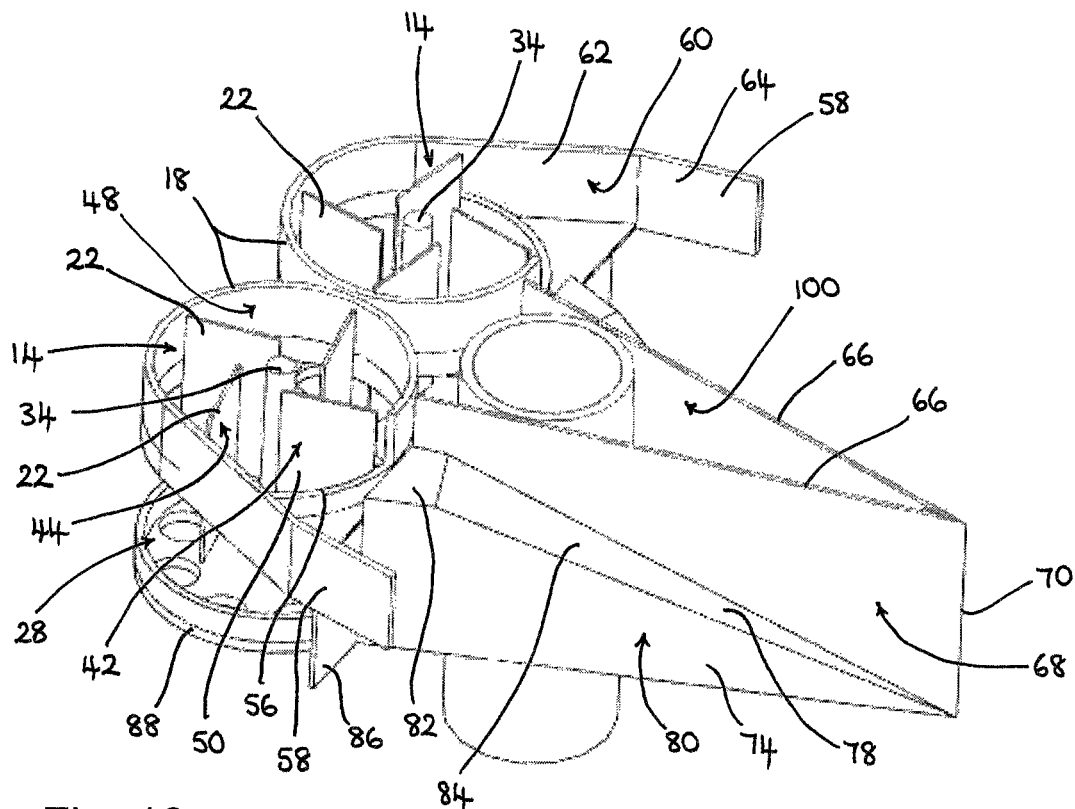
FIG. 10 is a perspective sectional view of the fluid turbine array along the line X-X of FIG. 8.

As shown most clearly in FIGS. 3 and 6 the fluid turbine 10 further comprises an inner guide panel or return side guide panel 66. The return side guide panel 66 extends from the casing 18 at the first edge 52 of the inlet 20 and, therefore extends from the casing 18 on an opposite side of the inlet 20 to the drive side guide panel 58. The return side guide panel 66 includes an inboard guide surface 68. The return side guide panel 66 extends outwardly from the casing 18 generally in a direction opposite the working fluid flow direction to a front edge 70. In this way the return side guide panel 66 captures a portion of the working fluid flow upstream of the inlet section 16 of the fluid turbine 10 and the inboard guide surface 68 guides or funnels the flow towards and through the inlet 20.

The return side guide panel 66 and drive side guide panel 58 diverge in a direction away from the inlet 20 and in a direction generally opposite the working fluid flow direction with the inboard and outboard guide surfaces 68, 60 facing generally towards each other. This allows the return side and drive side guide panels 66, 58 to capture a flow of working fluid upstream of the fluid turbine 10 from an area that is greater than the area of the inlet 20. In this embodiment the drive side guide panel 58 does not extend as far from the casing 18 as the return side guide panel 66.

The return side guide panel 66 is planar and extends substantially parallel to the rotational axis 12 of the turbine 10. The angle at which the return side guide panel 66 extends from the casing 18 may be such that the rotational axis 12 lies in the same plane as the return side guide panel 66. The return side guide panel 66 extends for the full axial length of the inlet section 16 parallel to the rotational axis 12. The return side guide panel 66 preferably extends beyond the axial ends of the inlet section 16.

The angle at which the inboard guide surface 68 extends from the casing 18 is set such that, during rotation of the rotor 14, the blades 22 pass through a point at which the leading surface 42 of one of the blades 22 is parallel to the inboard guide surface 68. The angle of the inboard guide surface 68 relative to the rotational axis 12 is therefore the same as the angle or pitch of the rotor blades 22. Accordingly, if the pitch of the blades 22 is able to be altered, it may be desirable to provide means to alter the angle of the inboard guide surface 68 relative to the casing 18.

As illustrated in FIGS. 15a and 15b, the inboard and outboard guide surfaces 68, 60 guide a flow of fluid through the inlet 20 such that a part of the inlet fluid flow strikes a pressure surface 44 of one of the blades 22 square-on to provide maximum thrust to the rotor 14. Maximum thrust continues as the square-on-blade (leading blade) sweeps the full angle of inlet fluid flow provided by the inboard and outboard guide surfaces 68, 60 diverging in a direction opposite the working fluid flow direction. During this, a trailing blade follows into the drive side acting as a flow guide to keep the inlet flow square-on to the leading blade. The trailing blade acts as a guide partly by directing fluid through annular gap 46 created by the blades being radially offset. In particular, pressure surface 44 may direct fluid through the annular gap 46. Additionally, leading surface 42 may also direct flow onto the leading blade. Importantly, with this arrangement as one square-on blade 22 rotates out of the drive side of the rotor 14 to the return side, so the trailing blade becomes the next square-on blade. The process repeats, continuously presenting a square-on blade for continuous maximum thrust to the rotor 14. It should be noted that embodiments with three or more than four blades will still provide for the trailing blade to guide inlet flow on to the leading blade for maximum thrust but will be at an angle other than square-on.

In other words the offset blades 22 and resultant annular gap 46 mean that, as well as a part of the inlet flow striking a pressure surface 44 of a blade 22 directly, another part of the inlet flow may be deflected by a pressure surface 44 of one blade 22 through the annular gap 46 and onto the pressure surface 44 of another blade 22. Importantly, with this arrangement as one square-on blade 22 rotates out of the drive side of the rotor 14 to the return side another square-on blade 22 comes into drive.

As described earlier, the inlet section 16 preferably comprises an inlet baffle 30 to restrict or limit fluid flow into the inlet 20 to obscure part of the drive side of the rotor 14 to generate a suction force on the returning blade 22. FIGS. 15a and 15b show the inlet baffle 30 performing a second function; serving to shield the blades 22 from the fluid flow into the inlet 20 as each blade 22 rotates into the drive side and arrives at a point at which the leading surface 42 of the blade 22 is parallel to the inboard guide surface 68. The return side guide panel 66, drive side guide panel 58 and inlet baffle 30 advantageously work together with the radially offset blades 22 to capture and guide a desired fluid flow into the drive side of the rotor 14 to impact on a continuously square-on blade for maximum thrust and efficiency.

The inlet baffle 30 extends from the first side edge 52 of the inlet 20 towards the second side edge 54. The inlet baffle 30 therefore extends from the return side guide panel 66 towards the drive side guide panel 58. The inlet baffle 30 extends for the full distance parallel with the turbine axis 12 between the end edges 56 of the inlet 20.

In some embodiments it may be desirable to connect the proximal end of the return side guide panel 66 to the inlet baffle 30. The proximal end of the return side guide panel 66 is therefore movable with the inlet baffle 30 such that the angle of the inboard guide surface 68 with respect to the casing 18 and the inlet 20 changes as the position of the inlet baffle 30 is adjusted. This can be used to optimise the fluid flow through the inlet 20.

FIGS. 15a and 15b show the angle of the blade 22 varying with respect to the direction of working fluid flow as the blade 22 rotates into the drive side of the inlet section 16. As the blade 22 incidentally passes into a range of angles that each provide a sufficient angle-of-approach between blade and fluid flow, so lift is generated in the same direction as rotation. This lift is caused by fluid passing over the outer edge 38 of the blade 22 while the blade 22 is within the correct range of angles and acts for a short period on the leading surface 42. This force is additional to the thrust force acting on the trailing surface or pressure surface 44. As the blade 22 rotates, the lift force diminishes as the gap narrows between the outer edge 38 and the casing 18 of the inlet section 16.

The lift force acting on the leading surface 42 also diminishes as the working fluid flow increases in turbulence. In another embodiment, flow straighteners may be positioned into the working fluid flow (not shown) extending from a region proximate the inlet 20 in a direction generally opposite to the working fluid flow direction. These work to condition the fluid flow for lower turbulence before entering the inlet section 16 through inlet 20. The flow straighteners preferably comprise planar panels with flow surfaces substantially parallel to the rotor axis 12. Alternatively, planar panel surfaces could be substantially transverse to the rotor axis 12, or a combination of both.

In a preferred embodiment of the turbine 10 which includes a return side guide panel 66, the flow straightening structure or flow straighteners may be supported by the panel 66. In a preferred embodiment of the turbine 10 which includes a drive side guide panel 58, the flow straightening structure may be supported by the panel 58, or a combination of both panels 66 and 58. Alternatively, in an embodiment of the turbine 10 including a funnel guide 74, support may be provided exclusively or additionally by guide 74.

An inlet section cap 72 may be disposed at an axial end of the inlet section 16. The inlet section cap 72 comprises a panel 72 extending transverse to the rotor axis 12. The panel 72 extends between an edge of the drive side guide panel 58 and the corresponding end of the casing 18 at the inlet 20. An inlet section cap 72 may be disposed between each end of the inlet section casing 18 and the respective edge of the drive side guide panel 58. The inlet section caps 72 assist in guiding or funneling a portion of the working fluid flow through the inlet 20.

In some embodiments, the inlet section caps 72 are removed to enable excess fluid flow to escape without entering the inlet casing 18. Escaping fluid flow passes the respective exhaust outlet 28 at a resultant angle formed partly from a direction parallel with the axis 12 and partly from a direction parallel to the working fluid flow. The velocity of the fluid flow creates a reduction in pressure adjacent to the exhaust outlet 28 to increase the draw of exhaust fluid from the exhaust region 24 and increase the efficiency of turbine 10.

To further assist in guiding fluid flow through the inlet 20, a funnel guide 74 extends from the casing 18 at each axial end of the inlet 20. The funnel guides 74 extend outwardly from the casing 18 generally in a direction opposite the working fluid flow direction. The funnel guides 74 are attached to and extend alongside axial end regions of the return side guide panel 66 that are disposed beyond the axial ends of the inlet 20. A distal end or tip 76 of each funnel guide 74 is disposed at or near the front edge 70 of the return side guide panel 66.

In this embodiment each funnel guide 74 comprises a flow surface 78 substantially transverse to the rotor axis 12 and an exhaust bypass surface 80 (performing a separate function to the funnel guide flow surface 78 as described later) substantially parallel to the rotor axis 12. The exhaust bypass surface 80 is on an opposite side of the funnel guide 74 to the return side guide panel 66. The funnel guide 74 is tapered such that a distance between the exhaust bypass surface 80 and the return side guide panel 66 is greater at the inlet 20 than at the front edge 70 of the return side guide panel 66.

Also, in this embodiment the larger end of the taper at the inlet 20 does not extend fully between the return side and drive side guide panels 66, 58 but may extend further in other embodiments to allow the exhaust bypass surface 80 to perform its separate function to a greater or lesser extent (as described later). Likewise, the smaller dimension at the front edge 70 may be increased such that a distance between the bypass surface 80 and the return side guide panel 66 is greater. This would increase the effectiveness of the funnel guide flow surface 78 to a maximum and reduce the effectiveness of the exhaust bypass surface 80 to zero.

Conversely, if the exhaust bypass surface 80 at the tip 76 was adjacent the return side guide panel 66, another embodiment may have the length of the tip increased in a direction parallel to the axis 12. If this length is increased such that the full length of funnel guide flow surface 78 was aligned with the axial end of the inlet 20, the effectiveness of the funnel guide flow surface 78 reduces to zero and the effectiveness of the exhaust bypass surface 80 is maximised. It will be appreciated that in practice, adjustment for maximum efficiency may result in a compromise of the two alternative embodiments of funnel guides 74 to appear as indicated in this embodiment.

Each flow surface 78 is aligned with a respective end edge 56 of the inlet 20 at a proximal end 81 of the funnel guide 74. The flow surface 78 extends from the casing 18 in a direction generally opposite the working fluid flow direction and at an angle of at least 90° to the rotor axis 12. At least a part of the flow surface 78 also extends axially away from the inlet 20 such that the opposing flow surfaces 78 diverge in a direction away from the casing 18. In other words, a distance between the opposing flow surfaces 78 is greater at the distal end 76 of the funnel guides 74 than at the proximal end 81 of the funnel guides 74.

The flow surfaces 78, acting together with the return side guide panel 66, capture a flow of working fluid upstream of the fluid turbine 10 from an area that is greater than the area of the inlet 20, and guide this flow into the inlet 20 of the turbine 10.

The flow surface 78 includes a proximal region 82 adjacent the inlet 20 in which the flow surface 78 is planar. An angle between the flow surface 78 in the proximal region 82 and the rotor axis 12 is approximately 90°. A distal region 84 of the flow surface 78, further from the inlet 20, is also planar but an angle between the flow surface 78 in this distal region 84 and the rotor axis 12 is greater than 90°. The configuration of the proximal region 82 acts to create a more laminar flow of fluid into the inlet 20 of the fluid turbine 10 and modifies the inlet fluid flow to be substantially perpendicular to the rotor axis 12. This modification of the fluid flow helps to increase the efficiency of the fluid turbine 10.

In another embodiment, the flow surface 78 may be shaped to modify the fluid flow into the inlet 20 of fluid turbine 10 with an aerodynamically contoured surface other than two planar regions 82 and 84.

The combination of the return side and drive side guide panels 66, 58 and the flow surface 78 of the funnel guide 74 increases the speed of flow of working fluid into the inlet 20 compared to the working fluid flow speed at a distance or remote from the fluid turbine 10.

The Exhaust Region

After imparting kinetic energy to the blades 22 of the rotor 14 the working fluid within the inlet section 16 flows in a direction substantially parallel to the axis 12 of the rotor 14 and into an exhaust region 24 of the turbine 10. The exhaust region 24 is, therefore, preferably disposed at an axial end of the inlet section 16. In preferred embodiments the turbine 10 includes two exhaust regions 24, one at each end of the inlet section 16.

It will be appreciated that fluid flow within the inlet section 16 of the turbine 10 will be turbulent and fluid will have a tendency to billow or to spiral around the turbine axis 12 as energy from the fluid is imparted to the blades 22. It will further be appreciated, however, that as the or each exhaust region 24 is axially offset from the inlet section 16, the net direction of fluid flow in the inlet section 16 will be substantially parallel to the turbine axis 12.

The exhaust region 24 is defined as the region at the end of the inlet section 16 through which the exhaust fluid exits the turbine 10. The exhaust fluid may, therefore, in some manner be confined within the exhaust region 24 until the exhaust fluid exits through the outlet 28. In other embodiments the exhaust fluid may flow through the second opening or outlet 28 and then through the exhaust region 24 of the fluid turbine. The exhaust region 24 includes the exhaust baffle 86 which deflects a part of the flow of working fluid proximate the outlet 28 to create a region of reduced pressure at the outlet 28. The shape and configuration of the exhaust baffle 86 therefore depends on the configuration of the exhaust region 24 and in particular the location of the outlet 28 relative to the inlet section 16 and the direction of the working fluid flow.

As shown most clearly in FIGS. 3 and 4, in this embodiment an end plate 88 is disposed in the exhaust region 24. The end plate 88 is arranged to block or restrict the flow of exhaust fluid out of the exhaust region 24 in a direction substantially parallel to the rotor axis 12. The end plate 88 is circular and has the same diameter as an external diameter of the inlet casing 18. In this embodiment the end plate 88 comprises a plurality of holes 90 to allow a flow of exhaust fluid through the end plate 88. In other embodiments the end plate 88 does not include holes 90 and fully blocks the flow of exhaust fluid out of the exhaust region 24 in a direction substantially parallel to the rotor axis 12.

Providing holes 90 in the end plate 88 may be particularly beneficial when the fluid turbine 10 forms part of an array of fluid turbines, as described further below.

The drive shaft 34 of the rotor 14 extends through and may be supported by the end plate 88 at each axial end of the turbine 10. Furthermore in this embodiment, as shown most clearly in FIGS. 4 and 6, the blades 22 of the rotor 14 extend into both exhaust regions 24. In other embodiments the blades 22 of the rotor 14 may not extend into the exhaust region(s) 24 and may terminate at the axial ends of the inlet section 16.

The end plate 88 and an end edge of the inlet casing 18 define a periphery of an exhaust section or exhaust chamber 92. In this embodiment the exhaust chamber 92 is open between the casing 18 and the end plate 88, i.e. the exhaust chamber 92 does not include a side wall in the form of a casing or housing surrounding the drive shaft 34 and blades 22. This peripheral opening of the exhaust chamber 92 provides a primary outlet 28 of the exhaust region 24, through which the majority of the exhaust fluid exits the exhaust region 24. In this embodiment the holes 90 in the end plate 88 provide a secondary outlet 28 of the exhaust region 24, through which a fraction of the exhaust fluid exits the exhaust region 24. In other embodiments a part of the casing 18 extends into the exhaust region 24 and spans the distance between the inlet section 16 and the end plate 88. The part of the casing 18 in the exhaust region 24 includes a gap that provides the outlet 28 and the outlet 28 preferably subtends an angle of approximately 270° from an upstream point of the casing 18 in the direction of rotor 14 rotation.

The exhaust baffle 86 comprises a deflector plate 94 disposed upstream of the primary exhaust outlet 28 relative to the working fluid flow direction. The deflector plate 94 extends between the inlet casing 18 and the end plate 88 in the axial direction. A width of the deflector plate 94, in a direction perpendicular to the rotor axis 12 and perpendicular to the working fluid flow direction, is greater than a diameter of the end plate 88. In this way an end region 96 of the deflector plate 94 extends or projects laterally from the exhaust chamber 92. Preferably the deflector plate 94 projects from both sides of the exhaust chamber 92.

In use, a portion of the working fluid flow strikes and is deflected by the deflector plate 94, and in particular by the end region 96 of the deflector plate 94. This creates a region of reduced pressure behind the end region 96 of the deflector plate 94, relative to the direction of the working fluid flow, and adjacent the primary outlet 28 of the exhaust region 24. This reduced pressure acts to draw exhaust fluid out of the outlet 28.

As shown most clearly in FIGS. 5 and 6, in this embodiment the exhaust baffle 86, formed in part by deflector plate 94, does not extend beyond the end plate 88 in an axial direction. In other embodiments, however, the exhaust baffle 86 may extend beyond the end plate 88 to deflect working fluid flow over the axial end of the turbine 10 and to create a region of reduced pressure proximate the holes 90 in the end plate 88. This region of reduced pressure may also extend slightly downstream of the holes 90 in the direction of the working fluid flow to also be proximate the primary exhaust outlet. These regions of reduced pressure further assist in drawing exhaust fluid from the exhaust chamber 92.

In an embodiment in which the end plate 88 does not include holes 90, an exhaust baffle 86 that extends beyond the end plate 88 in an axial direction may be detachable and moveable downstream in the direction of the working fluid flow to increase the effect of draw from the primary exhaust outlet 28.

In the present illustrated embodiment each exhaust bypass surface 80 (which is formed from part of the funnel guides 74 as described earlier), at an end 81 proximal to the exhaust chamber 92, is connected to a respective one of the deflector plates 94. The exhaust bypass surfaces 80 extend from the deflector plates 94 in a direction substantially opposite to the direction of the flow of working fluid, and therefore in a direction away from the exhaust chamber 92. The end region 96 of the deflector plate 94 is adjacent to and extends beyond the bypass surface 80 of the funnel guide 74, as shown most clearly in FIG. 3. The bypass surface 80 increases the speed of flow of the working fluid around the fluid turbine 10. The bypass surface 80 at an end 81 proximal to the exhaust chamber 92 therefore works in synergy with the exhaust baffle 86 to increase the draw of exhaust fluid from the exhaust region 24 of the turbine 10 in a region of the outlet 28 proximate the deflector plate 94.

In another embodiment of the turbine 10 in which the exhaust baffle 86 may not protrude sufficiently to present a deflector plate 94, the bypass surface 80 still has the benefit of increasing the speed of flow of the working fluid around the exhaust chamber 92 of fluid turbine 10 to create a region of low pressure at the exhaust region 24 without being enhanced by the deflector plate 94.

Each of the funnel guides 74 preferably also includes an exhaust guide surface 98. The exhaust guide surface 98 extends substantially transverse to the rotor axis 12 and extends from the exhaust region 24 in a direction generally opposite the working fluid flow direction. In some embodiments, the exhaust guide surface 98 is contoured or inclined with respect to the end plate 88 so as to increase the velocity of the portion of the working fluid flow that is deflected by the exhaust baffle 86.

In some embodiments, either when a single fluid turbine 10 is deployed in a working fluid or when a plurality of fluid turbines 10 are mounted in an array, it may be advantageous for the fluid turbine 10 or each of the fluid turbines 10 to include a tail panel or tail guide (not shown).

The tail panel is disposed generally on the return side of the rotor 14 and is arranged to deflect or guide working fluid flow around the side of the fluid turbine 10. The tail panel extends in a plane parallel with the rotor axis 12. The tail panel is generally in-line with or aligns with the working fluid flow direction.

In an axial direction the tail panel spans at least the exhaust chamber 92 of the turbine 10, i.e. an area between the end plate 88 and the end of the inlet section 16. In some embodiments the tail panel may additionally span the inlet section 16. In embodiments in which the fluid turbine 10 includes two exhaust regions 24, the tail panel may extend fully between the end plates 88 at opposite ends of the turbine 10. In embodiments in which the fluid turbine 10 includes two exhaust regions 24 but does not include end plates 88, the tail panel may extend fully between the full axial extent of the exhaust regions 24 at opposite ends of the turbine 10.

The tail panel may be connected to and extend from an outer surface 102 of the casing 18 in a direction generally the same as the working fluid flow direction (in the case of air, leeward of the casing 18). Additionally the tail panel may extend in a direction generally opposite or against the working fluid flow direction (in the case of air, windward of the casing 18). The tail panel may extend towards and may be in contact with the return side guide panel 66. In other embodiments the tail panel may extend from the return side guide panel 66 in a leeward direction (generally in the same direction as the working fluid flow) and may be spaced from the casing 18.

The tail panel may be planar, curved or any other suitable shape. Importantly, the tail panel deflects working fluid flow around the exhaust region 24 of the turbine 10 on the return side of the rotor 14 so as to create a region of reduced pressure proximate the outlet 28 of the exhaust region 24.

In particular, the tail panel works in combination with the exhaust baffle 86 to create a region of reduced pressure between the exhaust baffle 86 on the drive side of the rotor 14 and the tail panel on the return side of the rotor 14 that draws exhaust fluid from the exhaust region 24 of the turbine 10.

Fluid Turbine Mounting

The fluid turbine 10 is preferably attached to a suitable post or mast 2 such that the fluid turbine 10 is able to orient itself into the working fluid flow direction. The fluid turbine 10 is able to be mounted to an existing post or mast and does not require any additional supporting structure such as a platform. The fluid turbine 10 may be positioned at any location on the post 2 and in particular does not need to be mounted at a top of the post 2, but may be mounted at any desired position along the length of the post 2.

Means for connecting the fluid turbine 10 to the post 2 in the form of a mount (not shown) are preferably provided on the return side guide panel 66, when present. In particular it is preferable if the connection between the fluid turbine 10 and the post 2 is disposed on an opposite side of the return side guide panel 66 to the inboard guide surface 68 so as to not disrupt the flow of working fluid towards the inlet 20 of the turbine 10. This surface of the return side guide panel 66 opposite the inboard guide surface 68 may be considered to be a mounting surface 100. It will be appreciated that in embodiments in which the fluid turbine 10 does not include a return side guide panel 66, the mount may be connected to any suitable part of the fluid turbine 10, for example the casing 18.

The fluid turbine mount may comprise two parts; a first part for attachment to the post 2 and a second part attached to the fluid turbine 10 (and in particular to the return side guide panel 66 when present). The first and second parts are preferably moveable with respect to each other in such a way as to allow the fluid turbine 10 to rotate about the post 2. Other configurations of mount are possible that enable rotation of the fluid turbine 10 about the post 2, i.e. rotation about an axis parallel to an axis of the post 2.

The fluid turbine 10 will generally be mounted such that the axis of the turbine 10 is substantially parallel to an axis of the post 2. The mount may, however, be configured to enable tilting of the fluid turbine 10 about an axis perpendicular to the axis of the post 2. The mount may be configured to retain the fluid turbine 10 in a position in which the rotor axis 12 is either substantially vertical or substantially horizontal, irrespective of any movement of the post 2. This may have advantages if the fluid turbine 10 is attached to a floating structure, for example.

It will be appreciated that the fluid turbine mount may be configured to allow the fluid turbine 10 to be mounted or supported on or by any suitable structure, for example a part of a building or bridge.

The mount may therefore be configured to secure the fluid turbine 10 to a wall, roof or other similar support surface. The mount may be configured to allow an angle between the support surface and the return side guide panel 66 (when present) to be altered.

The fluid turbine 10 may be mounted in a fixed position with respect to the supporting structure, especially if there is a strong and relatively consistent prevailing fluid flow direction. This may, for example, be the flow of air through a tunnel.

FIGS. 16 to 20 illustrate an embodiment in which a rotor assembly is attached or secured to a floating structure 110 to act as a turbine 10. The floating structure 110 may be in the form of a platform, pontoon or a hull of a vessel, for example.

The turbine 10 is substantially identical to that described above and, in particular, includes an inlet section 16 including a casing 18 surrounding the rotor 14 and an exhaust region 24 at each axial end of the inlet section 16.

Each of the four blades 22 of the rotor 14 is supported by a blade shaft which is connected at first and second ends to a respective rotor cap 23. In this embodiment the blades 22 are confined within the casing 18 and do not extend into the exhaust regions 24.

The inlet section 16 further comprises a drive side guide panel 58 as described above. On an opposite side of the inlet 20 to the drive side guide panel 58 is an inlet baffle 30 which, in this embodiment, is separate from but attached to the casing 18. In this way the inlet baffle 30 may be moveable with respect to the casing 18 to adjust the extent to which the inlet baffle 30 obscures the inlet 20. As shown most clearly in FIG. 18, the inlet baffle 30 preferably comprises elongate slots 31 that engage with pegs or protrusions (not shown) of the casing 18 to permit sliding movement of the inlet baffle 30 with respect to the casing 18. Alternatively, a joining member (such as a bolt or similar) may extend through a hole in the casing 18 and through an aligned one of the slots 31 in the inlet baffle 30. In particular the slots 31 are elongate in a circumferential direction.

In this embodiment each exhaust region 24 includes an end plate 88. Each end plate 88 includes a plurality of holes 90, as described above. A drive shaft 34 of the rotor extends through and is supported by each end plate 88. A part of the casing 18 extends into each of the exhaust regions 24 and spans a distance between an end of the inlet section 16 and the end plate 88. Each part of the casing 18 in the exhaust regions 24 includes a gap that provides an outlet 28 of the respective exhaust chamber 92. The gap preferably subtends an angle of greater than 270° in a circumferential direction, and more preferably subtends an angle of between 270° and 300°.

The turbine 10 is mounted on a deflection structure 112 that comprises a tail panel 114 and a pair of exhaust baffles 86 including deflector plates 94. The tail panel 114 spans at least the distance between the end plates 88. Each of the deflector plates 94 includes an end region 96 that projects laterally from the exhaust chamber 92 in a direction substantially towards the drive side guide panel 58. In this embodiment each of the deflector plates 94 extends substantially perpendicularly from the tail panel 114.

The turbine 10 is mounted to the deflection structure 112 by a pair of bracket members 116. Each bracket member 116 includes an aperture 118 for receiving an end portion 35 of the rotor drive shaft 34 therethrough. In this embodiment a raised portion 37 of each of the end plates 88 engages in a respective one of the apertures 118. Each bracket member 116 is therefore disposed proximate a respective end of the drive shaft 34. A first end 120 of each of the bracket members 116 is attached to the tail panel 114. A second end 122 of each of the bracket members 116 is attached to a respective one of the deflector plates 94.

The turbine 10 is attached via the deflection structure 112, to the floating structure 110. The floating structure 110 comprises a platform 124 having an upper side or upper surface 126 and a lower side or lower surface 128. In use, the platform 124 is configured to float on or be disposed at the surface of a body of water, such as a river or the sea. In this position, the lower side 128 of the platform 124 is below the surface of the water such that objects secured to the lower surface 128 are underwater. The upper side 126 of the platform 124 is above the surface of the water such that objects secured to the upper surface 126 are not underwater.

In this embodiment a pair of funnel guides 74 are secured to the lower surface of the platform 124. Each of the funnel guides 74 includes a flow surface 78 and an exhaust bypass surface 80 as described above. It will be understood that a proximal end 81 of each of the funnel guides 74 is disposed adjacent a respective one of the exhaust regions 24 as described above. Each funnel guide 74 preferably also includes an exhaust guide surface 98, and a part of the deflector plate 94 extends beyond the exhaust guide surface 98 in an axial direction.

A housing 130 for a generator is disposed on the upper side 126 of the platform 124. This is advantageous as the cost and the maintenance of a generator that is located above the surface of the water is much reduced compared to a generator disposed underwater.

A connection between the turbine 10 (below the surface of the water) and the generator (above the surface of the water) may be made using any suitable drive mechanism. In preferred embodiments a drive belt links the drive shaft 34 of the turbine 10 to the generator. The drive belt therefore may extend through a suitable opening or openings in the platform 124. A casing 132 may surround the drive belt to prevent objects getting caught in the moving drive belt and to prolong the working life of the drive belt.

It will be appreciated that in other embodiments the generator may be mounted in any suitable location with respect to the turbine 10, and that any suitable drive mechanism may therefore be used to connect the turbine 10 to the generator.

It will be appreciated that a series or array of fluid turbines 10 may be connected to a single structure, for example to a post 2 or to a floating structure 110. The fluid turbines 10 may be arranged such that the inlet 20 of each fluid turbine 10 is pointing in a different direction. The fluid turbines 10 may be configured such that, even when the direction of the working fluid flow changes, at least one of the fluid turbines 10 of the array will be oriented such that a portion of the working fluid flows into the inlet 20 of the turbine 10.

Fluid Turbine Array

The fluid turbine 10 of the present invention may be mounted in an array comprising at least two turbines.

Figure 11:
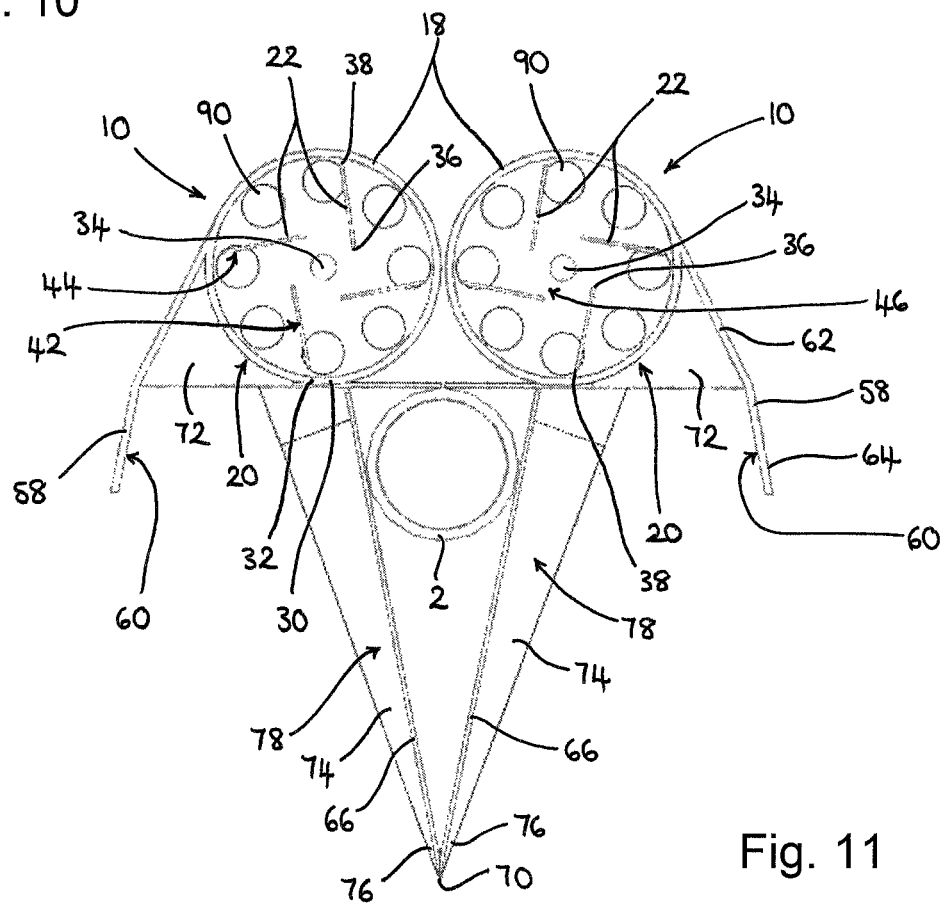
FIG. 11 is a cross-sectional view of the fluid turbine array along the line X-X of FIG. 8.
Figure 12:
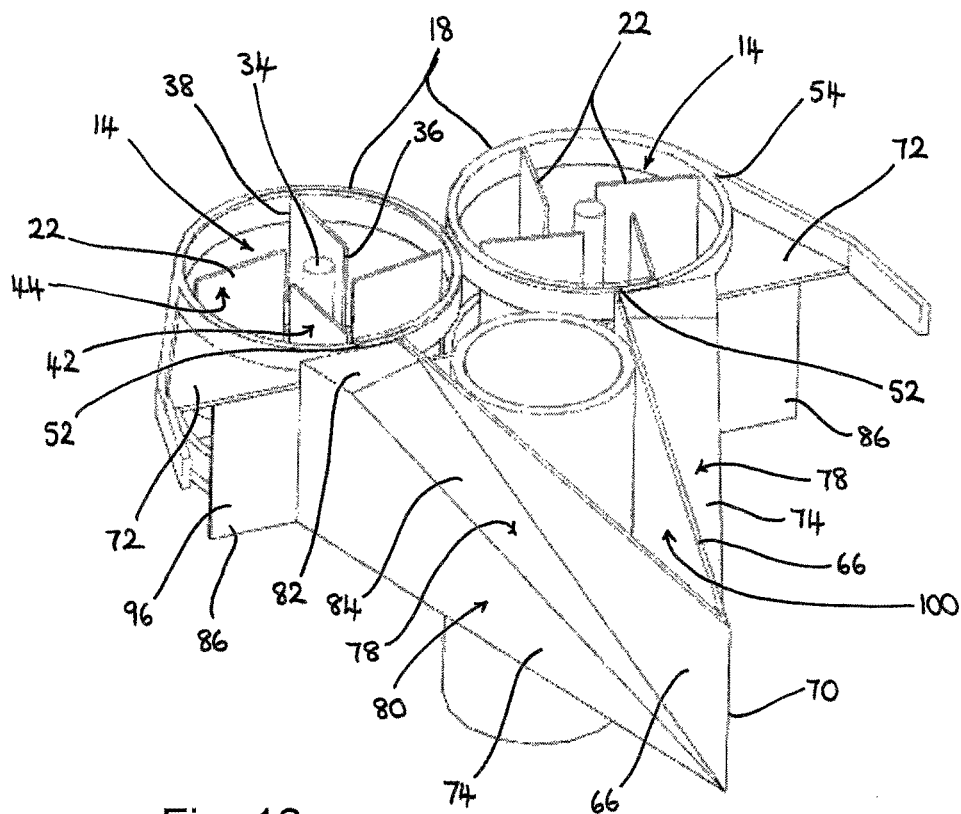
FIG. 12 is a perspective sectional view of the fluid turbine array along the line XII-XII of FIG. 7.
Figure 13:
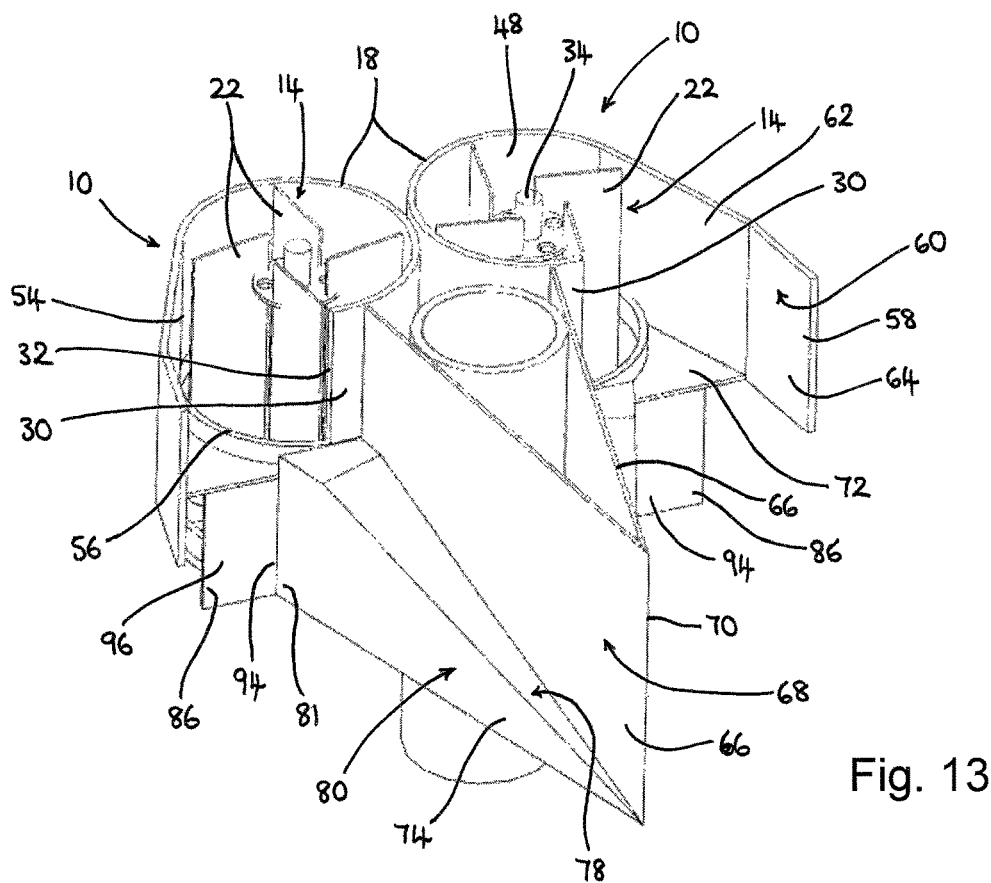
FIG. 13 is a perspective sectional view of the fluid turbine array along the line XIII-XIII of FIG. 7.
Figure 14:
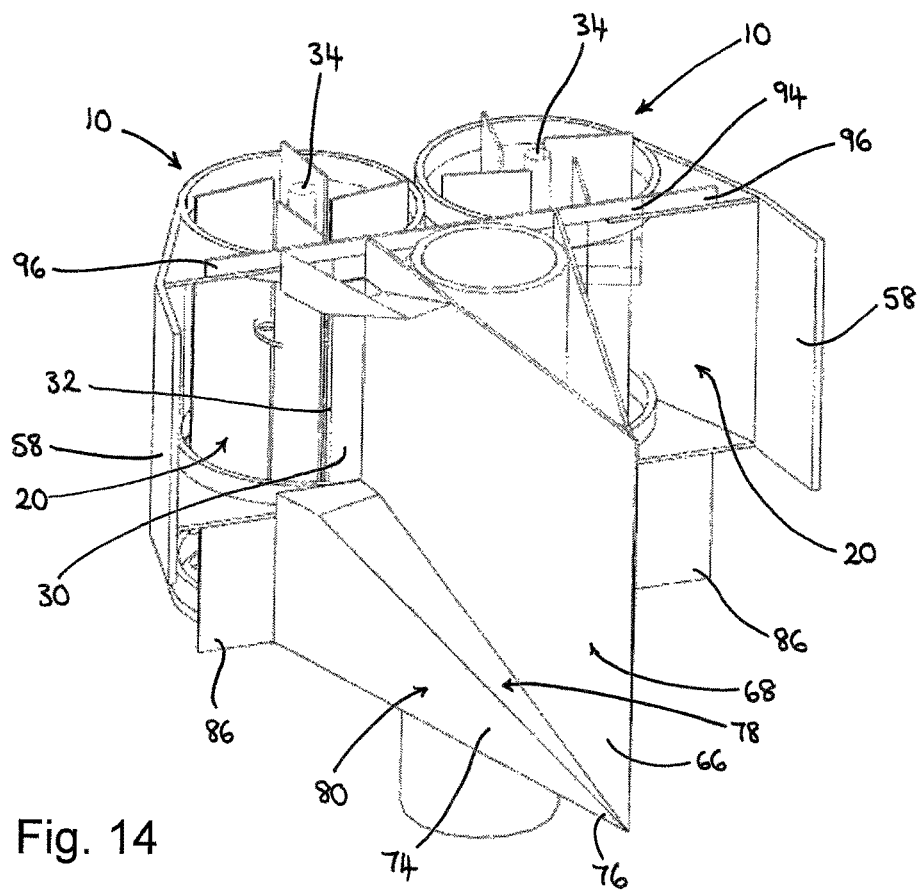
FIG. 14 is a perspective sectional view of the fluid turbine array along the line XIV-XIV of FIG. 7.

As illustrated most clearly in FIGS. 3 and 11 a pair of fluid turbines 10 may be mounted together about a post 2. The turbines 10 are mounted such that the mounting surfaces 100 of the return side guide panels 66 face each other, and the post 2 is disposed or clamped between the return side guide panels 66. The casings 18 of the inlet sections 16 of the fluid turbines 10 are adjacent each other and on the same side of the post 2. The front edges 70 of the return side guide panels 66 are in touching contact along the full length of the edge 70. This arrangement could be described as a mirrored pair. This means that a portion of working fluid flow that would have been incident on the section of the post 2 to which the fluid turbines 10 are attached is deflected by the inboard guide surfaces 68 either side of the post 2 and towards the inlets 20 of the turbines 10. It also means that another portion of working fluid flow that would have been incident on the section of the post 2 to which the fluid turbines 10 are attached is deflected around the mirrored pair of turbines 10 to enhance the region of reduced pressure at exhaust outlet regions 24.

In another embodiment, the casings 18 of the inlet sections 16 of the fluid turbines 10 may be spaced apart. In yet another embodiment they may be spaced apart and not on the same side of the post 2. Spacing the casings 18 apart increases the angle between return side guide panels to increase the velocity of the portion of working fluid flow entering inlets 20. It also serves to increase the velocity of the portion of working fluid flow deflected around the mirrored pair of turbines 10 to further enhance the region of reduced pressure at exhaust outlet regions 24.

In the illustrated embodiment the dimensions of the post 2 are such that the post 2 is disposed adjacent the proximal end of each of the return side guide panels 66. It will be appreciated, however, that the dimensions of the post 2 may be such that the post is disposed proximate the distal end of the return side guide panels 66, or at any point between the return side guide panels 66. It will further be appreciated that the post 2 may be of any reasonable dimensions, and may have any cross-sectional shape. The post may be a member of an existing structure rather than a dedicated post or mast.

In embodiments in which the fluid turbines 10 do not include return side guide panels 66, the post 2 may be disposed between the casings 18 of the fluid turbines 10 or attached to exhaust baffles 86 if present.

It is envisaged that arrays of turbines 10 comprising more than two turbines may be constructed. In these arrays the turbines 10 may be arranged in numerous ways depending on, amongst other factors, the shape or configuration of the structure to which the turbines 10 are attached and the available space and fluid flow.

The fluid turbines 10 may be in a stacked array. In a stacked array the fluid turbines 10 are arranged end to end such that the rotor axes 12 of the turbines 10 are parallel and co-axial. In embodiments in which the fluid turbines 10 have a single exhaust region 24, the stacked array therefore comprises a single exhaust region 24 between two inlet sections 16. In a preferred embodiment, in which the fluid turbines 10 have two exhaust regions 24 (one at each end), the stacked array therefore comprises two exhaust regions 24 between the inlet sections 16. The or each exhaust region 24 disposed between two inlet sections 16 may also include an end plate 88 that fully blocks exhaust fluid from flowing into the exhaust region 24 or inlet section 16 of the neighbouring fluid turbine 10.

An exhaust region 24 disposed at an end or both ends of the stacked array may comprise an end plate 88 including holes 90 as described above to provide an additional (secondary) outlet for the exhaust fluid.

Alternatively, the exhaust region 24 disposed at an end of the stacked array may comprise an end plate 88 including an end baffle (not shown). The end baffle configured to extend from the end plate 88, as described above, in a direction parallel to the rotor axis 12. The end baffle may also project in a direction substantially perpendicular to the rotor axis 12 from the exhaust chamber 92 proximate the outlet 28 of the exhaust region 24. Working fluid flowing over or around the end of the stacked array is deflected by the end baffle which creates an additional region of reduced pressure at the outlet 28 of the end fluid turbine 10 in the array.

Alternatively, an exhaust region 24 disposed at an end or both ends of the stacked array that includes an end plate 88 with no holes 90 represents another embodiment. In this embodiment the end baffle may be detachable. As described above, this detachable section may then be moved downstream in a direction parallel to the working fluid flow direction to increase the effect of draw from the primary exhaust outlet 28.

In a preferred embodiment, the exhaust guide surface 98, formed from funnel guide 74, is contoured or inclined with respect to the end plate 88. As described above, this will increase the velocity of the portion of the working fluid flow passing over the axial end of turbine 10. In this embodiment, turbine 10 with exhaust guide surface 98 contoured or inclined with respect to the end plate 88, is disposed at an end or both ends of the stacked array. Intermediate turbines will not be so contoured or inclined.

The above stacked array of turbines is arranged as a single column of turbines. In an alternative and preferred arrangement, each turbine forms one of a side-by-side mirrored pair as described above, forming a mirrored pair of columns.

In an alternative arrangement of a stacked mirrored pair of columns, in which each turbine 10 has two exhaust regions 24 (one at each end), the two columns may be staggered with respect to each other such that they are no longer mirrored. Each inlet section 16 of one column is then adjacent a pair of exhaust regions 24 of the other column. In this arrangement, the front edge 70 of each return side guide panel 66 can be offset from a central position between neighbouring turbines to partially or completely obscure the neighbouring exhaust regions 24. This increases the area of capture of working fluid flow and increases the velocity of fluid flow into the inlet 20 of each turbine 10.

The fluid turbines 10 may be in a winged array in which the fluid turbines 10 are in a general side-by-side arrangement. In these arrays neighbouring turbines 10 may be arranged such that the return side guide panel 66 of one turbine 10 is attached, connected or proximate to the drive side guide panel 58 of another turbine 10. In particular a distal region of the return side guide panel 66 of one turbine 10 may be connected to a distal region of the drive side guide panel 58 of another turbine 10.

In a fluid turbine array, neighbouring turbines 10 may be arranged such that the drive side guide panel 58 of one fluid turbine 10 is connected to the tail panel of another fluid turbine 10.

In an arrangement in which each turbine 10 forms one of a side-by-side mirrored pair as described above, an additional embodiment of the turbine array may comprise a single tail guide disposed between the two side-by-side casings 18, the tail guide extending from the casings 18 in a direction generally the same as the working fluid flow direction (as described above). The tail guide therefore separates the neighbouring outlets 28 of each exhaust region 24. The shared tail panel works to prevent exhaust fluid exiting one exhaust region 24 influencing the flow pattern and pressure variations of its neighbouring exhaust region 24.

The transverse axis fluid turbine 10 of the present invention therefore includes one or more features that improves the efficiency of the fluid turbine 10 relative to prior art designs. Additionally, the configuration of the fluid turbine 10 is preferably such that the blades 22 are not exposed thereby reducing the likelihood of harming wildlife, reducing noise and eliminating shadow flicker on nearby surfaces.

Fluid Pump or Propeller

As mentioned above, in other aspects and embodiments of the invention, rather than the drive shaft of the rotor being coupled to a generator to form a turbine, the drive shaft of the rotor may be connected to a motor. In these embodiments, therefore, rather than the rotor being driven by a fluid flow striking the blades of the rotor as described above, the rotor is driven to rotate by the motor, thereby resulting in a fluid flow through the rotor assembly.

With the rotor assembly attached to a structure and disposed in a suitable fluid, the motor may be operated to rotate the rotor such that the assembly acts as a fluid pump or a propeller. The rotor assembly may be attached to a static structure when operated as a fluid pump. Alternatively, the rotor assembly may be attached to a suitable moving airborne or floating structure or vessel. The pump or propeller may be mounted on a hull of a floating vessel or structure below the surface of a body of water.

In these embodiments the rotor assembly may be mounted and oriented such that the rotor may be driven to rotate preferably in an opposite direction to that described above in the fluid turbine such that fluid flows through the rotor assembly in an opposite direction. In particular, fluid may flow in through the second opening provided at the or each axial end of the rotor, and the fluid may then flow out through the first opening provided in the casing. Fluid flow into the rotor assembly through the or each second opening is preferably generally in a direction parallel to the rotational axis of the rotor and fluid flow from the rotor assembly through the first opening is preferably generally in a direction transverse or perpendicular to the rotational axis of the rotor. Accordingly, the inlet section 16 described in the above embodiment of a fluid turbine becomes an outlet section of the rotor assembly.

It will be appreciated that in the above description of the fluid turbine, features of the rotor assembly and fluid turbine have been referred to using terms appropriate for the operation of the rotor assembly as a turbine and with the direction of fluid flow through the turbine as described above. Various features of the rotor assembly and fluid turbine described above may also be utilised in a similar way in a fluid pump or propeller according to the invention. For example, in a propeller with the rotor axis generally vertical the guide panels 58, 66 may be utilised as a means to direct the direction of fluid flow out of the rotor assembly to provide some degree of steering to a vessel. Similarly, if the rotor axis is generally horizontal flow surfaces 78 may be utilised as a means to direct the direction of fluid flow out of the rotor assembly to provide some degree of steering to a vessel. Baffle 30, when provided as a moveable baffle, may provide a means of reducing the thrust of a propeller or reducing the volumetric flow rate of a fluid pump.

It will be appreciated that the pitch of the blades may be adjusted or adjustable to optimise operation of the pump or propeller.

It is envisaged, however, that a similar system including a rotor assembly according to the present invention may be used both as a fluid turbine and as a pump or propeller. Accordingly, the system may be arranged such that in a first mode of operation the drive shaft may be connectable to a generator such that a fluid flow through the rotor assembly rotates the rotor and drive shaft to generate power, and in a second mode or operation the drive shaft may be connectable to a motor such that the motor rotates the rotor to cause fluid flow through the rotor assembly. This may, for example, enable the system to be attached to a hull of a boat and to be operated as a turbine when the boat is moored in a tidal river and to be operated as a propeller when a user wishes to move the boat. The rotor assembly may be as illustrated in FIGS. 16 to 20 and described above. In particular, the housing 130 on the upper side 126 of the platform 124 may house a motor in addition to or in place of the generator.

It will be appreciated that the various features of the rotor assembly and fluid turbine described above may be used in different combinations, and that some embodiments of the invention may not include all of the features described above.

Further embodiments of the invention can also be contemplated without departing from the scope of the invention as defined in the appended claims.

The invention claimed is:

1. A transverse axis fluid turbine for use in a working fluid flow comprising:
a rotor having four blades and an axis defining a turbine axis about which the rotor rotates, each blade having a pressure surface and being spaced from the axis of the rotor such that there is a gap between the axis and an inner edge of each blade through which fluid can flow, and the inner edge and an outer edge of each blade lying in and defining a blade plane and wherein the blade plane passes through the blade between the inner and outer edges of each blade, and each blade being offset from the axis of the rotor such that the axis does not lie in the blade plane, wherein the blade planes of adjacent blades are substantially perpendicular to each other and wherein the blade plane of a first one of the blades is substantially perpendicular to the pressure surface of a second, adjacent one of the blades, and the blade plane of a first one of the blades is positioned between an end of the second adjacent one of the blades and a midway point of the second, adjacent one of the blades;
an inlet section comprising a casing partially surrounding the rotor, the casing having an inlet to permit a portion of the working fluid flow to enter the casing to drive the rotor; and
an exhaust region at an axial end of the inlet section, such that fluid flow through the inlet section is from the inlet to the exhaust region, the exhaust region being axially offset from the inlet;
wherein angles between the blades are such that part of the fluid flow within the inlet section is deflected by the pressure surface of the first one of the blades through said gap between the axis and the blade inner edge and onto the pressure surface of the second, adjacent one of the blades.

2. A fluid turbine as claimed in claim 1, wherein an angle between each blade plane and a plane containing the rotor axis and the blade inner edge is adjustable, with an angle between blade planes of adjacent blades remaining constant.

3. A fluid turbine as claimed in any one of claim 1, further comprising a rotor cap disposed proximate an end of the blades, the rotor cap having a radial dimension up to half a swept radius of the rotor, and the rotor cap being arranged to at least partially restrict a flow of fluid from a region beyond the end of the blades into a central region of the rotor including the gap between the turbine axis and the inner edge of each blade.

4. A fluid turbine as claimed in claim 1 further comprising a drive shaft coaxial with the turbine axis.

5. A fluid turbine as claimed in claim 1, wherein the inlet section comprises a guide panel extending outwardly from the casing at an edge of the inlet, the guide panel extending generally in a direction opposite a working fluid flow direction and the guide panel being arranged to guide a portion of the working fluid flow into the casing through the inlet.

6. A fluid turbine as claimed in claim 1, wherein the inlet section comprises a return side guide panel extending outwardly from the casing proximate an edge of the inlet proximate a return side of the rotor, the return side guide panel extending generally in a direction opposite a working fluid flow direction and being arranged to guide a portion of the working fluid flow into the casing through the inlet.

7. A fluid turbine as claimed in claim 6, wherein, during rotation of the rotor, each blade passes through a forward position at which the blade is proximate the inlet and the blade plane is parallel to but offset from a plane of the return side guide panel.

8. A fluid turbine as claimed in claim 1, wherein the inlet section comprises a drive side guide panel extending outwardly from the casing proximate an edge of the inlet furthest from a return side of the rotor, the drive side guide panel extending generally in a direction opposite a working fluid flow direction and being arranged to guide a portion of the working fluid flow into the casing through the inlet.

9. A fluid turbine as claimed in claim 6, wherein the inlet section further comprises a drive side guide panel extending outwardly from the casing proximate an edge of the inlet furthest from a return side of the rotor, the drive side guide panel extending generally in the direction opposite the working fluid flow direction and being arranged to guide the portion of the working fluid flow into the casing through the inlet, and wherein the return side and drive side guide panels diverge in the direction opposite the working fluid flow direction.

10. A fluid turbine as claimed in claim 1, wherein the inlet section comprises an inlet baffle that partially blocks the inlet of the casing, the inlet baffle extending from a side of the inlet proximate a return side of the rotor and obscuring a part of a drive side of the rotor, and the inlet baffle being configured to obstruct a portion of the working fluid flow such that a region of reduced pressure is formed at a rear of the inlet baffle to create a suction force on a returning blade as the returning blade passes or approaches the inlet baffle.

11. A fluid turbine as claimed in claim 1, wherein the inlet section comprises an inlet baffle that partially blocks the inlet of the casing, the inlet baffle extending from a side of the inlet proximate the return side of the rotor and obscuring a part of a drive side of the rotor, and the inlet baffle being configured to obstruct a portion of the working fluid flow such that a region of reduced pressure is formed at a rear of the inlet baffle to create a suction force on a returning blade as the returning blade passes or approaches the inlet baffle.

12. A fluid turbine as claimed in claim 10, wherein the inlet baffle is moveable to alter a degree to which the inlet baffle obscures the drive side of the rotor.

13. A fluid turbine as claimed in claim 11, wherein an edge of the inlet baffle is set to lie substantially in the same plane as the blade in a forward position.

14. A method of generating electricity using a fluid turbine according to claim 1, the method comprising connecting a drive shaft of the fluid turbine directly or indirectly to a generator.

15. A method of using a fluid turbine according to claim 1 as a rotor assembly for pumping or generating propulsion, the method comprising connecting a drive shaft of the fluid turbine directly or indirectly to a motor.

* * * * *